(12) United States Patent
Law et al.

(10) Patent No.: US 10,542,052 B2
(45) Date of Patent: Jan. 21, 2020

(54) MULTI-AREA GROUPING

(71) Applicant: Samsung Electronics Co., Ltd, Suwon-si (KR)

(72) Inventors: David H. Law, Mountain View, CA (US); Scott R. Ysebert, Mountain View, CA (US); Sheng Kai Tang, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/699,863

(22) Filed: Sep. 8, 2017

(65) Prior Publication Data
US 2018/0316731 A1 Nov. 1, 2018

Related U.S. Application Data

(60) Provisional application No. 62/491,231, filed on Apr. 27, 2017.

(51) Int. Cl.
| | | |
|---|---|---|
| *H04L 12/66* | (2006.01) | |
| *H04B 3/00* | (2006.01) | |
| *H04K 1/10* | (2006.01) | |
| *H04L 29/06* | (2006.01) | |
| *H04W 4/70* | (2018.01) | |
| *H04H 20/74* | (2008.01) | |
| *H04L 29/08* | (2006.01) | |

(52) U.S. Cl.
CPC ............ *H04L 65/103* (2013.01); *H04L 67/16* (2013.01)

(58) Field of Classification Search
CPC .............................. H04L 65/103; H04L 67/16
See application file for complete search history.

(56) References Cited

U.S. PATENT DOCUMENTS

| | | | |
|---|---|---|---|
| 2007/0124780 A1 | 5/2007 | Lee | |
| 2007/0206690 A1* | 9/2007 | Sperschneider | ...... G10L 19/008 375/260 |
| 2010/0142468 A1 | 6/2010 | Cheong et al. | |
| 2013/0003993 A1* | 1/2013 | Michalski | .............. H04H 20/74 381/119 |
| 2014/0068751 A1 | 3/2014 | Last | |

(Continued)

FOREIGN PATENT DOCUMENTS

| | | |
|---|---|---|
| KR | 10-2016-0038699 A | 4/2016 |
| KR | 10-2016-0058580 A | 5/2016 |
| KR | 10-2017-0015039 A | 2/2017 |

OTHER PUBLICATIONS

Communication from a foreign patent office in a counterpart foreign application, ISA/KR, "International Search Report," International Application No. PCT/KR2017/011207, dated Jan. 23, 2018, 11 pages.

*Primary Examiner* — Kiet Tang

(57) ABSTRACT

A first media device, method, and non-transitory computer readable medium for multi-area grouping of devices. The first media device includes a transceiver and a processor coupled to the transceiver. The processor detects a second media device that is not subscribed to the media group. The processor assigns the detected second media device to the media group. The processor determines a total amount of media devices in the media group. The processor recommends a multi-channel configuration for the media group based on the determined total amount of media devices.

20 Claims, 19 Drawing Sheets

(56) References Cited

U.S. PATENT DOCUMENTS

| | | |
|---|---|---|
| 2014/0093085 A1 | 4/2014 | Jarvis et al. |
| 2016/0037573 A1 | 2/2016 | Ko et al. |
| 2016/0073197 A1* | 3/2016 | Hammer ............... H04W 12/04 381/80 |
| 2016/0142736 A1 | 5/2016 | Kim et al. |
| 2016/0291141 A1 | 10/2016 | Ham et al. |
| 2016/0299669 A1 | 10/2016 | Bates |
| 2017/0048648 A1* | 2/2017 | Lee ........................ H04W 4/70 |
| 2017/0123037 A1 | 5/2017 | Kim et al. |

* cited by examiner

| TV | Sound bar | Speakers | Display As | Go To Setup Flow |
|---|---|---|---|---|
| 0 | 0 | 1 | <RoomName> \| <Model> | None |
| 0 | 0 | 2 | <RoomName> \| 2 speakers | Stereo |
| 0 | 0 | 3 | <RoomName> \| 3 speakers | 3chan L/C/R |
| 0 | 0 | 4 | <RoomName> \| 4 speakers | 4chan L/R |
| 1 | 1 | 0 | <RoomName> \| 2 speakers | TV +SB - 2 speaker |
| 1 | 1 | 1 | <RoomName> \| 3 speakers | TV+SB+1 speaker |
| 1 | 1 | 2 | <RoomName> \| 3 speakers | TV+SB+Surround L/R |
| 1 | 1 | 3 | <RoomName> \| 3 speakers | TV+SB+Surround L/R+Sub |
| 1 | 1 | 4 | <RoomName> \| 3 speakers | TV+SB+Surround L/R+ Front L/R |
| 1 | 0 | 0 | <RoomName> \| TV | None |
| 1 | 0 | 1 | <RoomName> \| 3 speakers | TV+Sub |
| 1 | 0 | 2 | <RoomName> \| 3 speakers | TV+Surround L/R OR TV+Front L/R |
| 1 | 0 | 3 | <RoomName> \| 3 speakers | TV+Surround L/R OR TV+Front L/R + Sub |
| 1 | 0 | 4 | <RoomName> \| 3 speakers | TV+Surround L/R+Front L/R |

FIGURE 6

MULTI-AREA GROUPING

CROSS-REFERENCE TO RELATED APPLICATION AND CLAIM OF PRIORITY

This application claims priority under 35 U.S.C. § 119(e) to U.S. Provisional Patent Application No. 62/491,231 filed on Apr. 27, 2017, title "COLOR GROUPING." The above-identified provisional patent application is hereby incorporated by reference in its entirety.

TECHNICAL FIELD

This disclosure relates generally to multi-area grouping. More specifically, this disclosure relates to grouping devices in multiple zones using different wireless technologies.

BACKGROUND

Current multi-room/multi-device audio/video (A/V) systems rely on the user to manually group, name, and label their A/V devices where the manual creation of "groups" of devices with arbitrary names adds complexity to first time setup and subsequent operation of the system. For example, two speakers in the same room might be grouped together as left/right, whereas two speakers in different rooms might be grouped together as "Zone 1". The user is left to determine for themselves the appropriate channel configurations for their speakers and then destroy or recreate these groups any time they want to modify that grouping and use the multi-room functionality.

SUMMARY

This disclosure provides for multi-area grouping of devices.

In a first embodiment, a first media device provides for multi-area grouping of devices. The first media device includes a transceiver and a processor coupled to the transceiver. The processor detects a second media device that is not subscribed to the media group. The processor assigns the detected second media device to the media group. The processor determines a total amount of media devices in the media group. The processor recommends a multi-channel configuration for the media group based on the determined total amount of media devices.

In a second embodiment, a method provides for multi-area grouping of devices. The method includes detecting a media device that is not subscribed to a media group. The method further includes assigning the detected media device to the media group, determining a total amount of media devices in the media group, and recommending a multi-channel configuration for the media group based on the determined total amount of media devices.

In a third embodiment, a non-transitory medium embodying a computer program provides for multi-area grouping of devices. The program code, when executed by at least one processor, causes a processor to detect a second media device that is not subscribed to a media group. The program code, when executed by at least one processor, further causes a processor to assign the detected second media device to the media group. The program code, when executed by at least one processor, further causes a processor to determine a total amount of media devices in the media group. The program code, when executed by at least one processor, further causes a processor to recommend a multi-channel configuration for the media group based on the determined total amount of media devices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 6 and 7 illustrate examples device configuration knowledge according to embodiments of the present disclosure;

DETAILED DESCRIPTION

FIGS. 1 through 18, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged Internet of things system.

Figure 1:
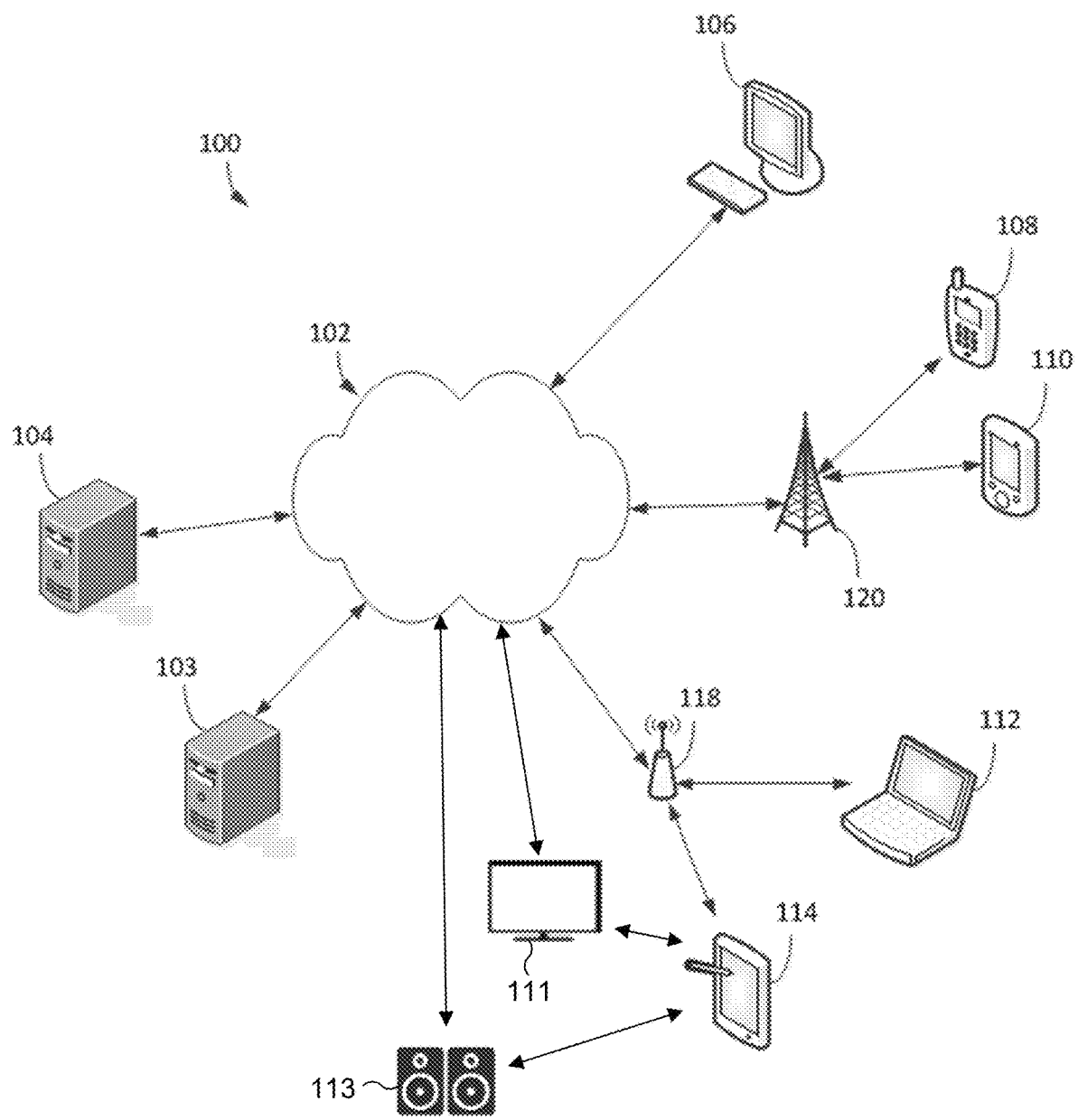
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-114. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephones or smartphones 108, a personal digital assistant (PDA) 110, a smart television 111, a laptop computer 112, a smart speaker 113, a tablet computer 114, a headset, a display, a wearable device, smart watch, etc. However, any other or additional electronic devices could be used in the communication system 100.

In this example, some electronic devices 108-114 communicate indirectly with the network 102. For example, the electronic devices 108-110 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s). For example, the television 111 and speaker 113 could communicate with the tablet computer 114 over a Bluetooth connection and communicate with other devices including the servers 103 and 104 over Wi-Fi.

As described in more detail below, the electronic devices 108-114 interact to form multi-area groups for playing content. While electronic devices 108-114 are described as forming multi-area groups for playing content, servers 103 and 104 could also be utilized for forming multi-area groups for playing content.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
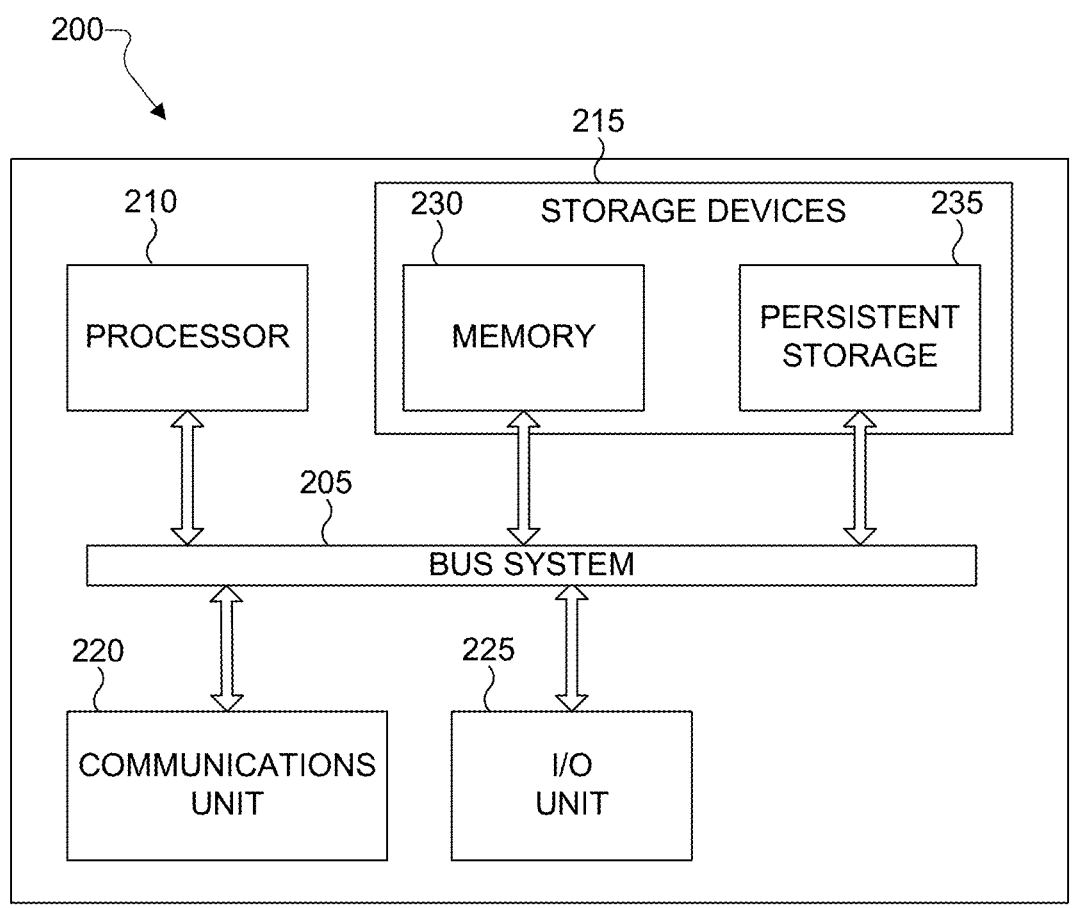
FIG. 2 illustrates an example server according to embodiments of the present disclosure.
Figure 3:
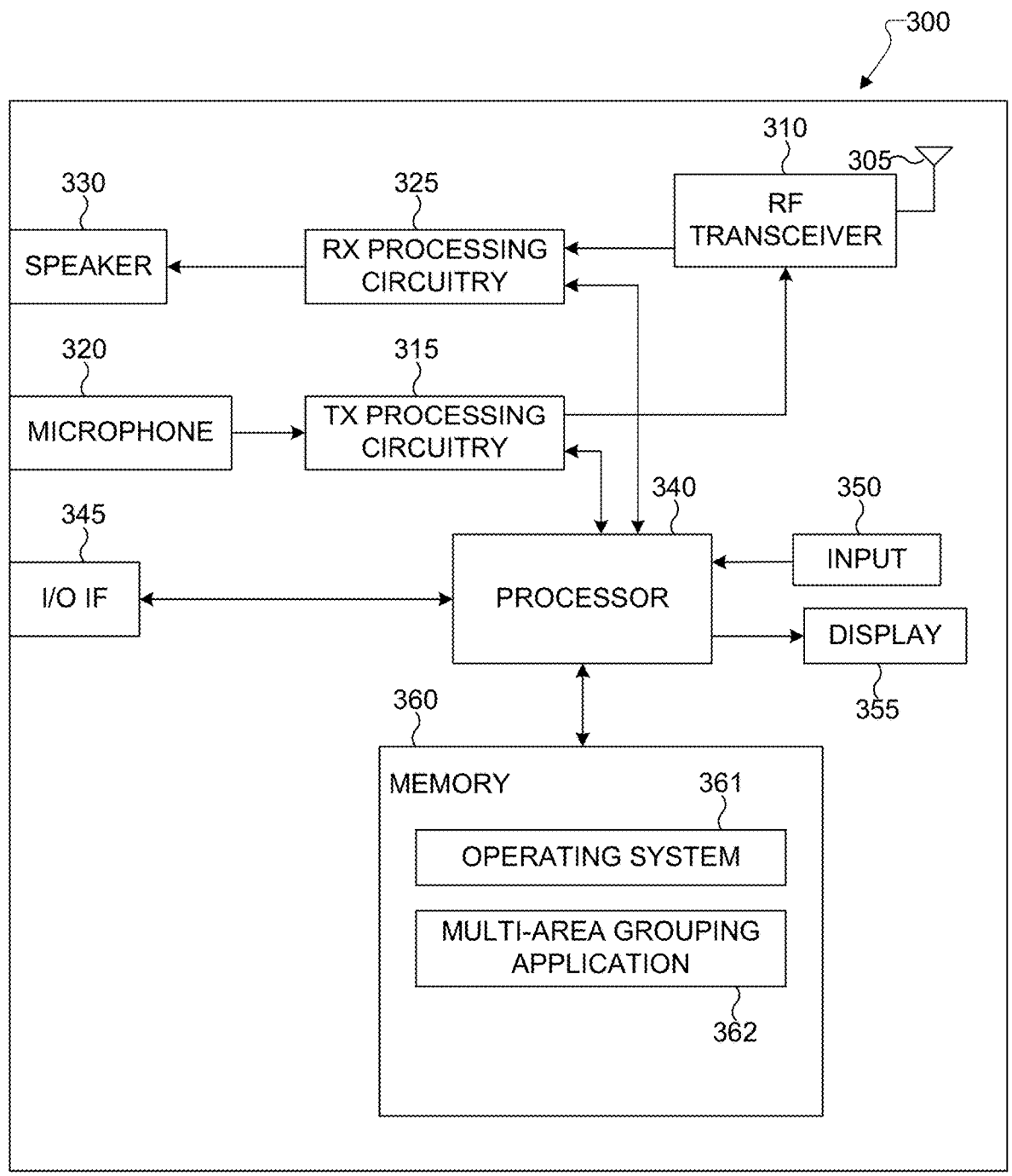
FIG. 3 illustrates an example electronic device according to embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 103 or the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As described in more detail below, the communications unit 220 receives a data regarding the multi-area groups to be stored into storage device 215, each from a different electronic device 108-114. The server 200 uses the processor 210 to manage operations of the application, different device groups, and content.

As shown in FIG. 3, the electronic device 300 includes an antenna 305, a radio frequency (RF) transceiver 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processors and execute the OS program 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the transceiver 310 transmits or receives signals for multi-area grouping of device and playback of content. The electronic device 300 performs multi-area grouping tasks and playback of content.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
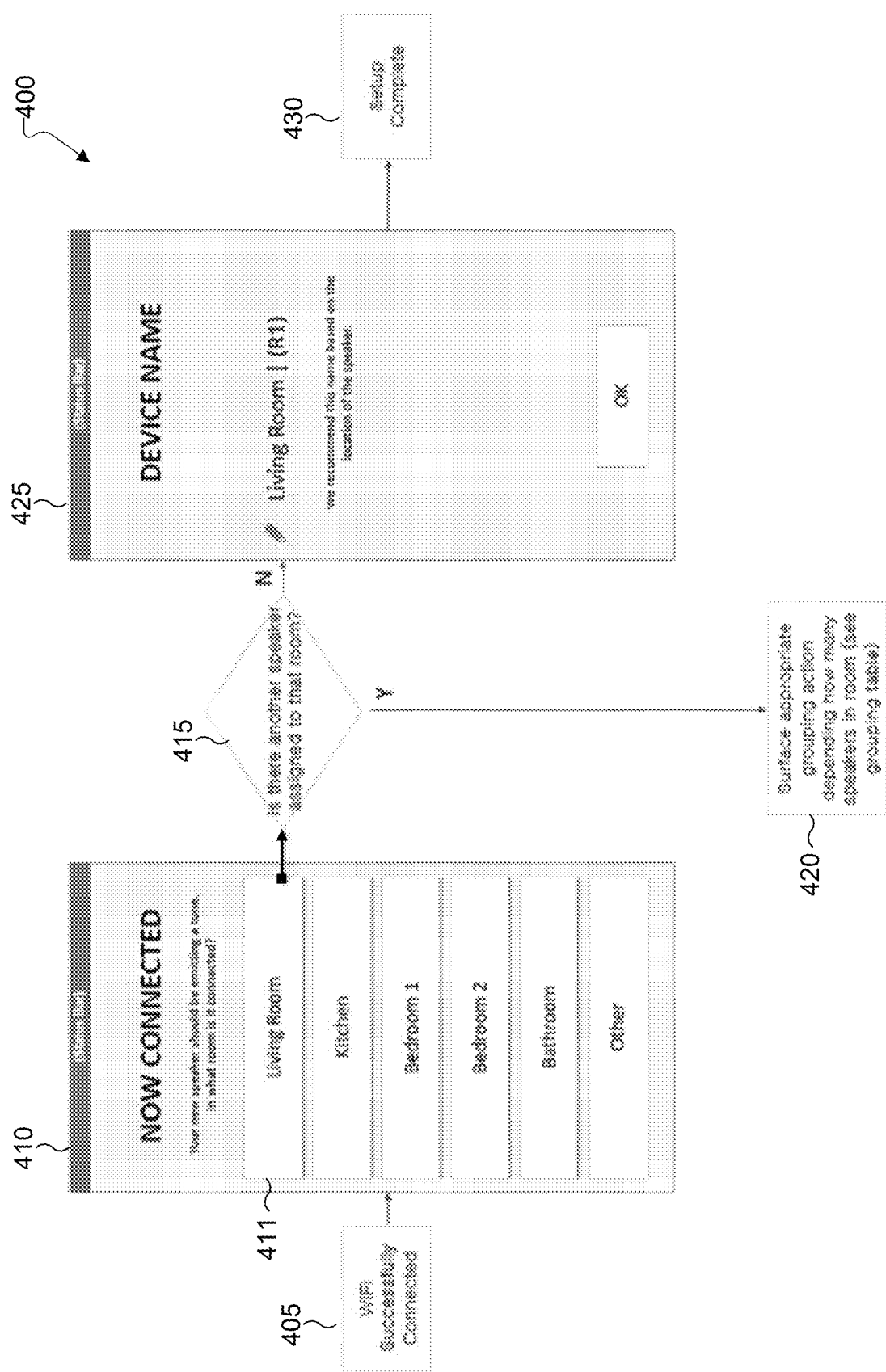
FIG. 4 illustrates an example flow of adding a single device into a group according to embodiments of the present disclosure.

FIG. 4 illustrates an example flow 400 of adding a single device into a group according to embodiments of the present disclosure. For example, the flow 400 depicted in FIG. 4 may be performed by the electronic device 106-114 in FIG. 1 or the electronic device 300 in FIG. 3.

A media device can describe any of the electronic devices 106-114 in FIG. 1, the electronic device 300 in FIG. 3. The media device can run the application 362 as either a master device or as content device in a group, such as a speaker, display, television, etc. As a master device, the media device can control the content or other media device in a group for playback of content. As a content device, the media device plays back the content indicated by the master device and received from a different source, such as a URL. The media device includes a displayed indication of the content stream corresponding to a group that the media device is assigned to and changes the content stream by selecting a new indication.

In operation 405, the multi area grouping application 362 detects a media device connecting to a Wi-Fi network where the multi-area grouping application 362 is operating. The multi-area grouping application can automatically recognize a new media device connected to the Wi-Fi or be instructed by a user that a new media device is being added to the multi-area grouping.

In operation 410, the multi area grouping application 362 connects to the new media device. The application 362 controls the media device to emit a tone indicating that the new media device is connected and ready for adding to a group. The application 362 displays a list of groups 411 to a user for selection of the group to be added. The application can name the groups to easily identify each group, for example by associating the groups with specific rooms in a dwelling. If a new group 411 is selected, a name is suggested by the application 362.

In operation 415, the multi area grouping application 362 determines whether there are any other speakers currently assigned for the group 411 selected by the user. The application 362 can check the group from storage devices 215 on a server 200 or in the memory 360 of the electronic device 300.

In operation 420, the multi area grouping application 362 performs surface appropriate grouping action depending on how many speakers or other media devices are in the area. The application 362 searches through a grouping table for the appropriate grouping action, such as a grouping table illustrated in FIG. 6.

In operation 425, the multi area grouping application 362 recommends a name for the new media device. Once a group is selected, a name for the media device is recommended, but could also be customized by the user. The recommendation can be based on the area selection, the devices already assigned to the group, the type and/or model of the existing devices and the new media device, and/or potential relationships between the existing devices and the new media device. The relationship may be based on playback content commonly support, a physical relationship between the existing device and the new media device, and/or position or location of the new media device within the grouping area, etc.

In operation 430, the multi area grouping application 362 completes the setup of the new media device. The new media device is ready for use with the selected group 411.

Although FIG. 4 illustrates an example flow 400 for adding a single device into a group, various changes could be made to FIG. 4. For example, while shown as a series of steps, various steps in each figure could overlap, occur in parallel, occur in a different order, or occur multiple times.

Figure 5:
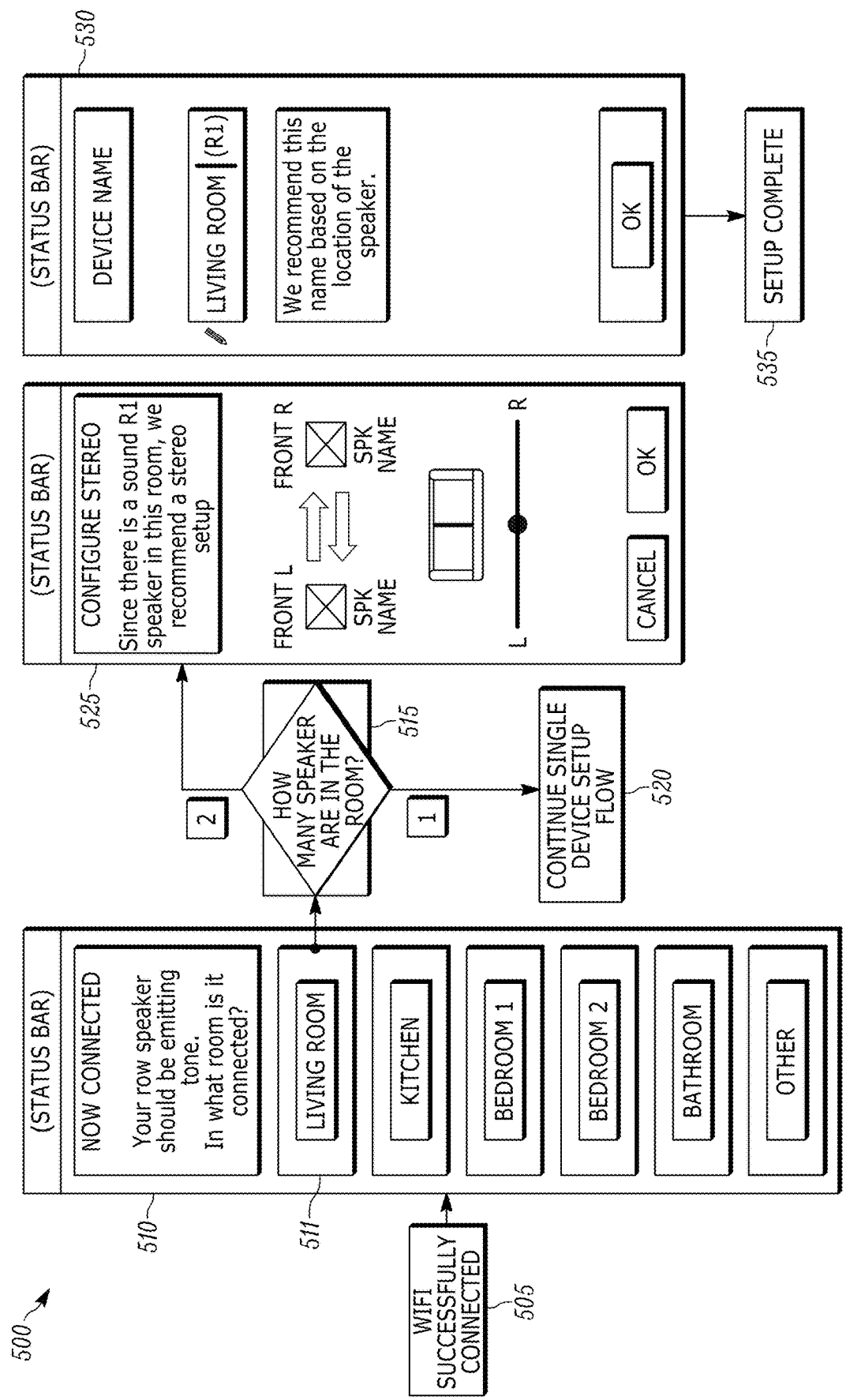
FIG. 5 illustrates an example flow of adding multiple devices into a group according to embodiments of the present disclosure.

FIG. 5 illustrates an example flow 500 of adding multiple devices into a group according to embodiments of the present disclosure. For example, the flow 500 depicted in FIG. 5 may be performed by the electronic device 106-114 in FIG. 1 or the electronic device 300 in FIG. 3.

In operation 505, the multi area grouping application 362 detects a media device connecting to a Wi-Fi network where the multi-area grouping application 362 is operating. The multi-area grouping application can automatically recognize a new media device connected to the Wi-Fi or be instructed by a user that a new media device is being added to the multi-area grouping.

In operation 510, the multi area grouping application 362 connects to the new media device. The application 362 controls the media device to emit a tone indicating that the new media device is connected and ready for adding to a group. The application 362 displays a list of groups 511 to a user for selection of the group to be added. The application can name the groups to easily identify each group, for example by associating the groups with specific areas in a dwelling. If a new group 511 is selected, a name is suggested by the application 362.

In operation 515, the multi area grouping application 362 determines the amount of speakers currently assigned for the group 511 selected by the user. The application 362 can check the group from storage devices 215 on a server 200 or in the memory 360 of the electronic device 300.

In operation 520, the multi area grouping application 362 determines that there are no other media devices in the selected group 511. The application 362 searches through a grouping table for the appropriate grouping action.

In operation 525, the multi area grouping application 362 recommends setup for the new media device and the other media devices in the group based on the character of the new media device and the number of existing devices currently in the group 411. For example, when the application 362 determines that the new media device is a speaker and a second speaker previously exist in the selected group 411, the application can recommend a stereo configuration to the user.

In operation 530, the multi area grouping application 362 recommends a name for the new media device. Once a group is selected, a name for the media device is recommended, but could also be customized by the user. The recommendation can be based on the area selection, the devices already assigned to the group, the type and/or model of the existing devices and the new media device, and/or potential relationships between the existing devices and the new media device. The relationship may be based on playback content commonly support, a physical relationship between the existing device and the new media device, and/or position or location of the new media device within the grouping area, etc.

In operation 535, the multi area grouping application 362 completes the setup of the new media device. The new media device is ready for use with the selected group 511.

Although FIG. 5 illustrates an example flow 500 for adding multiple devices into a group, various changes could be made to FIG. 5. For example, while shown as a series of steps, various steps in each figure could overlap, occur in parallel, occur in a different order, or occur multiple times.

Figure 7:
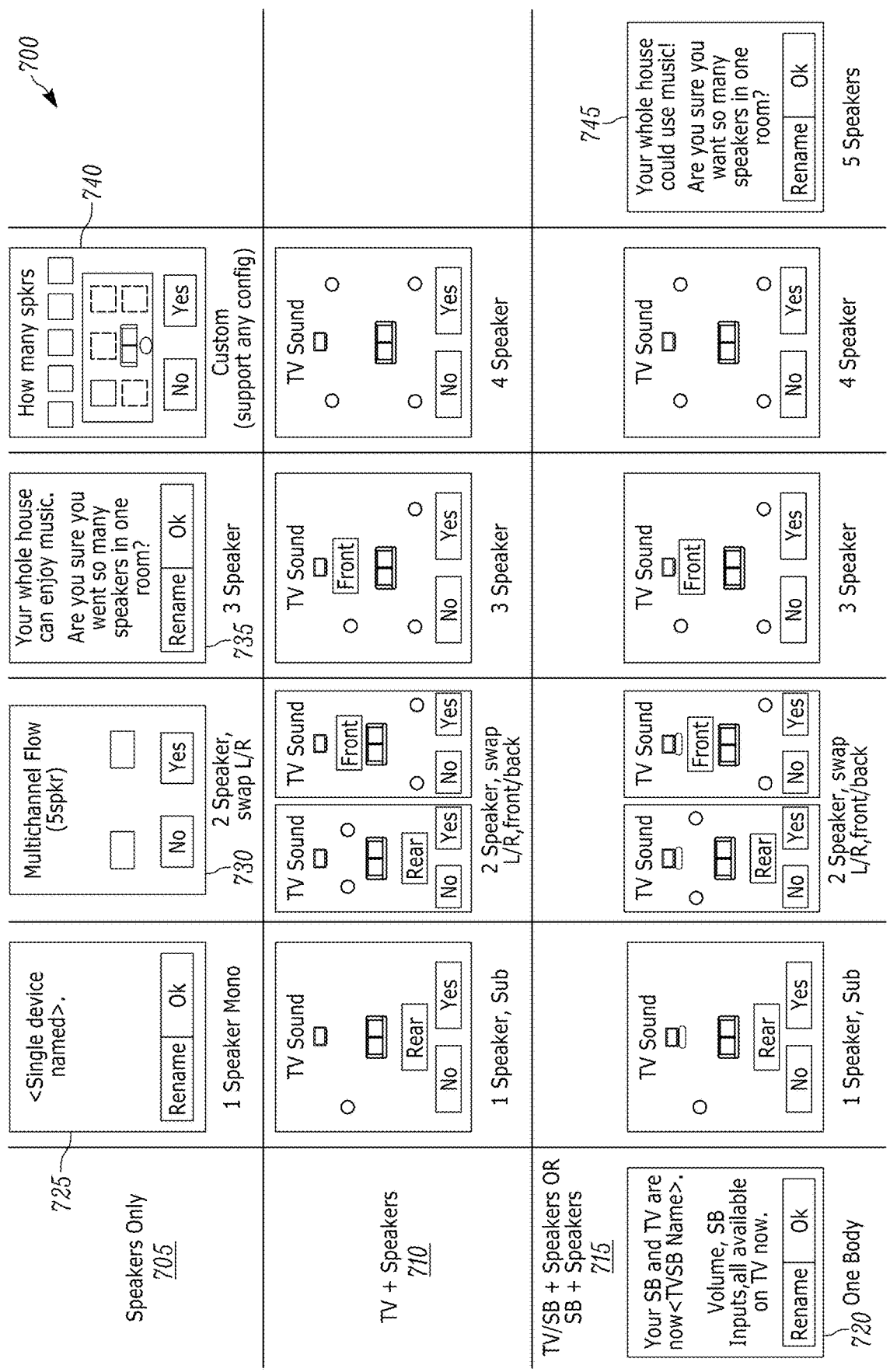

FIGS. 6 and 7 illustrate examples device configuration knowledge 600 and 700 according to embodiments of the present disclosure. The embodiments of the device configuration knowledge 600 illustrated in FIG. 6 and the device configuration knowledge 700 illustrated in FIG. 7 are for illustration only. FIGS. 6 and 7 do not limit the scope of this disclosure to any particular embodiment of an electronic device.

The device configuration knowledge 600 is illustrated as a table with different combinations of media devices, such as TVs 605, sound bars 610, and speakers 615. Depending on the amount of each media device, the application 362 can display a recommended group configuration 620 and call the setup flow 625 for the recommended group configuration 620.

The device configuration knowledge 700 is illustrated as a chart with rows identified by the characterization of the device in the group, such as speakers only 705, television and speakers 710, and television or sound bar with speakers or sound bar with speakers 715. The columns determine the operation configuration with the devices in the group based on the amount of devices, such as multiple speakers acting as one body 720, one speaker 725, two speakers 730, three speakers 735, four speakers 740, or five speakers 745. Depending on the amount of detected media devices, the UI presents a recommended group configuration. For example, when a TV and one speaker in the group, the UI presents the recommend locations for the TV and the speaker, or presents a recommended location for the speaker in relation to the television. The recommendations are further customized for areas that have been defined either by a user or some other spatial recognition method. In situations where multiple speaker recommendations exist, such as a television with two speakers, the UI could present multiple configuration by splitting the screen or having a different page for each configuration. The televisions with two speakers could be set up as the television with the two speakers in the front or the television in the front and the speakers set up in the back for surround sound.

Figure 8:
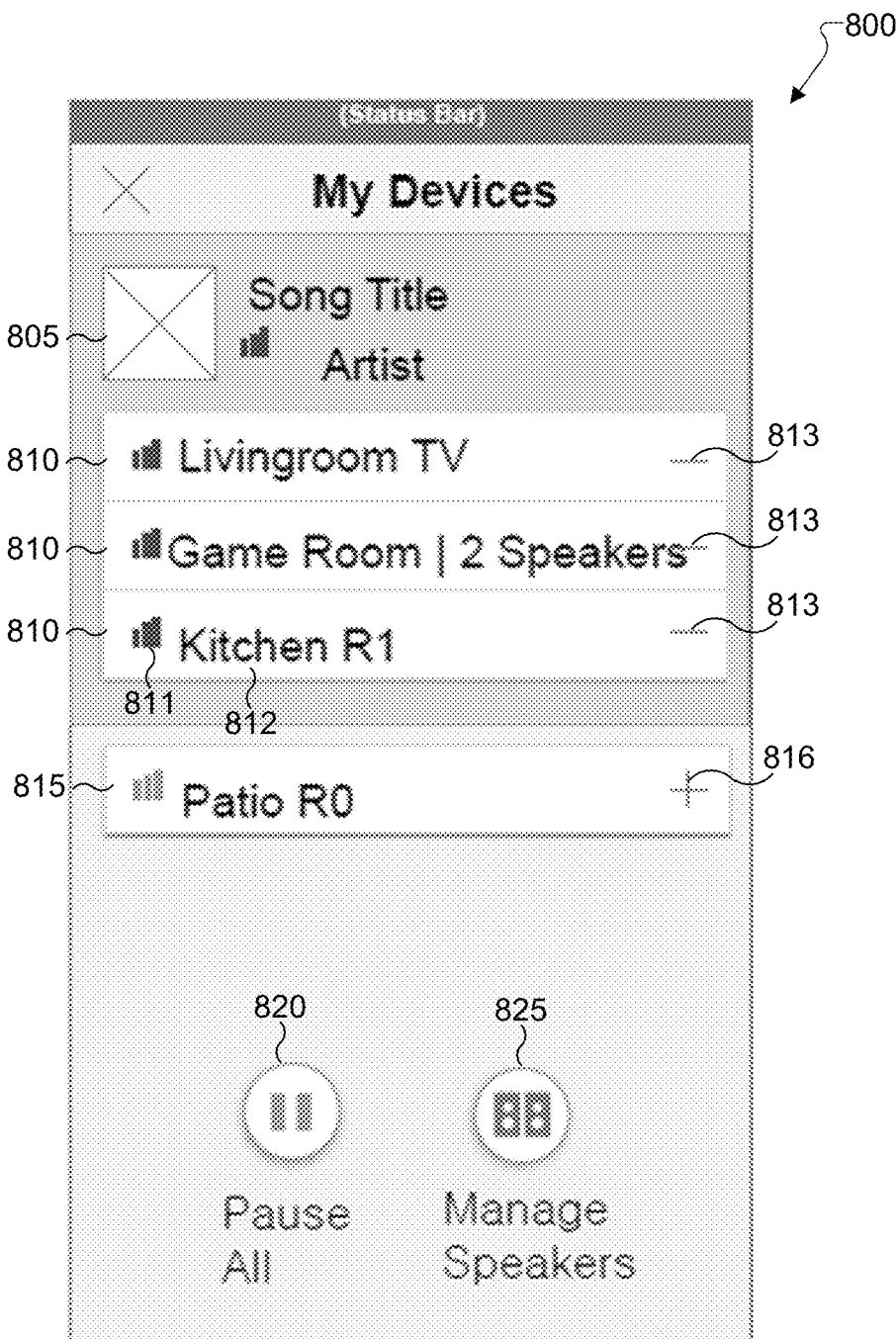
FIG. 8 illustrates an example user interface according to embodiments of the present disclosure.

FIG. 8 illustrates an example user interface 800 according to embodiments of the present disclosure. The embodiment of the user interface 800 illustrated in FIG. 8 is for illustration only. FIG. 8 does not limit the scope of this disclosure to any particular embodiment of an electronic device.

The user interface 800 includes media content 805, active group(s) 810, non-active group(s) 815, content control 820, and speaker controls 825. The user interface 800 provides easy content and group control.

The media content 805 is displayed on the user interface 800. The media content 805 is a representation of the content being played on the active group(s) 810. For example, an album cover or song cover along with the song title, artist, and other information of the can be displayed when the media content is audio content.

The active group(s) 810 includes the group(s) of devices that have been selected by the user to play the media content 805. The active group(s) 810 includes information such as speaker level 811, group name 812, and an unselect icon 813. The speaker level 811 can indicate that sound is playing or indicate the volume level set for the specific group. The group name 812 indicates the group selected. The unselect icon 813 allows the user to change the group to a non-active group 815.

The non-active group(s) 815 is displayed separately from the active group(s) 810. The non-active group(s) 815 is groups that have been setup, but have not been selected for outputting the specific media content or are groups that are currently being used by other instances of the application 362. The non-active group(s) includes information such as speaker level 811, group name 812, and a select icon 816. The speaker level 811 can indicate that none of the current media content is being played using the group, the volume level of the previous action of the group, or the volume level being used by the other instance of the application 362. The select icon 816 allows the user to change the group to an active group 810.

The content control 820 is used to control the selected media. The content control 820 can launch a separate interface for control of the content or be used to directly control the content. More than one content control 820 can be displayed on the user interface 800. The content control can include any feature related to the content, such as pause/play, rewind, mute, previous/next content, etc.

The device control 825 is used to adjust the settings of a selected group, whether active 810 or non-active 815. The device control 825 can launch a separate interface for control of the devices within a selected group. For example, the device control can change device configurations, add or remove specific devices from a group, etc. The device control 825 is described in greater detail in regards to FIG. 10.

Figure 9:
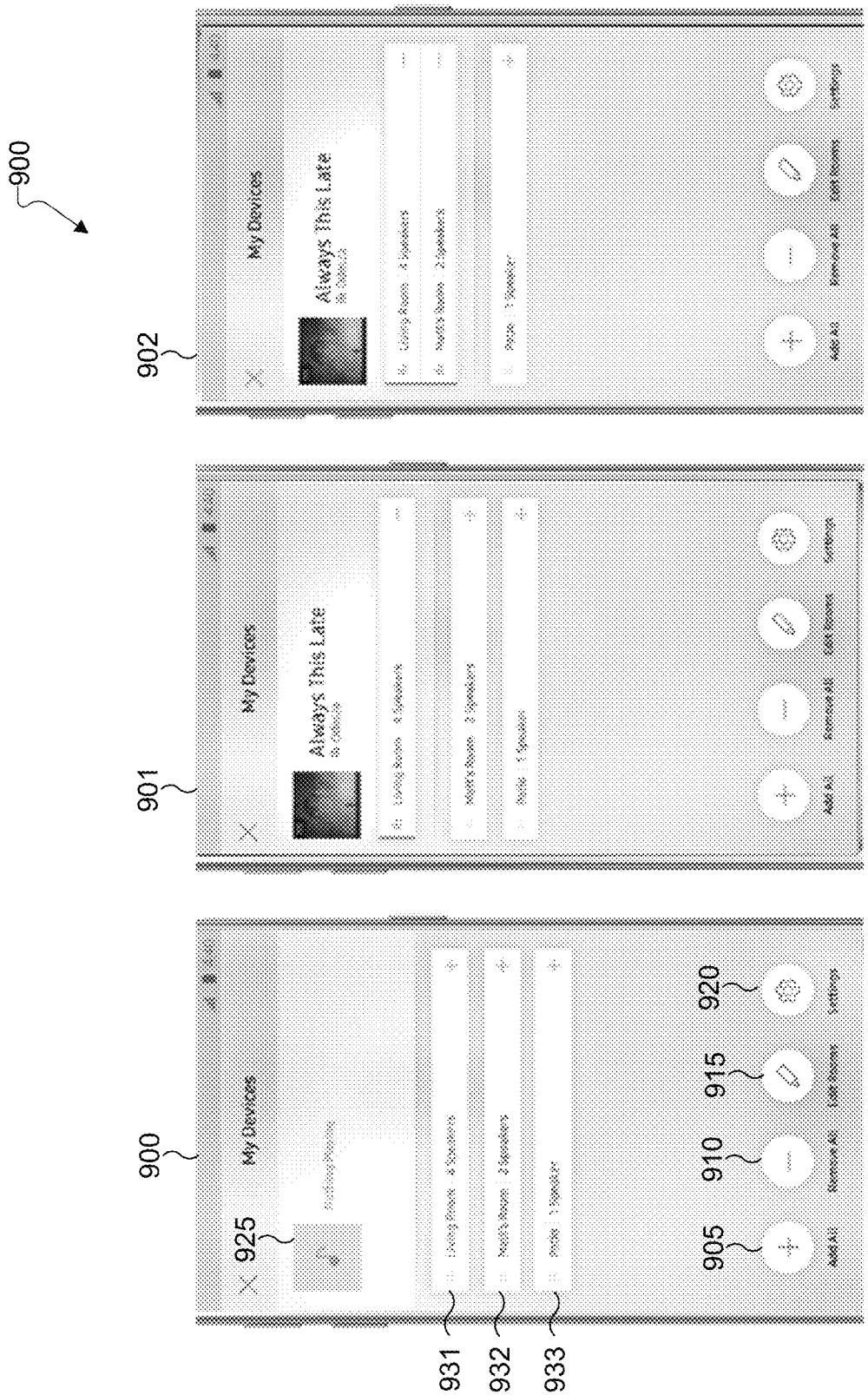
FIG. 9 illustrates an example interfaces of adding groups to an active grouping according to embodiments of the present disclosure.

FIG. 9 illustrates example interfaces 900, 901, 902 of adding groups to an active grouping according to embodiments of the present disclosure. The embodiment of the interfaces 900, 901, and 902 illustrated in FIG. 9 are for illustration only. FIG. 9 does not limit the scope of this disclosure to any particular embodiment of an electronic device.

The interfaces 900, 901, 902 include an add-all icon 905, remove-all icon 910, an edit-group icon 915, settings icon 920. The add-all icon 905 adds active all groups at one time. If some groups had already been selected, the remaining groups will also be selected. The remove-all icon 910 removes de-select active groups. The edit-groups icon 915 allows a user to edit the selected group. The settings icon 920 allows the user to view and change settings of the user interface 900, 901, 902.

The user interfaces also include content 925, a first group 931, a second group 932, and a third group 933. Interface 900 has all three groups 931, 932, 933 in an inactive state. Interface 901 activates the first group 931, but the second group 932 and the third group 933 remain in an inactive state. Interface 902 activates the second ground 932 with the first group 931 already activated, while the third group 933 remains inactive. The interface 902 plays the content simultaneously on the first group 931 and the second group 932.

Figure 10:
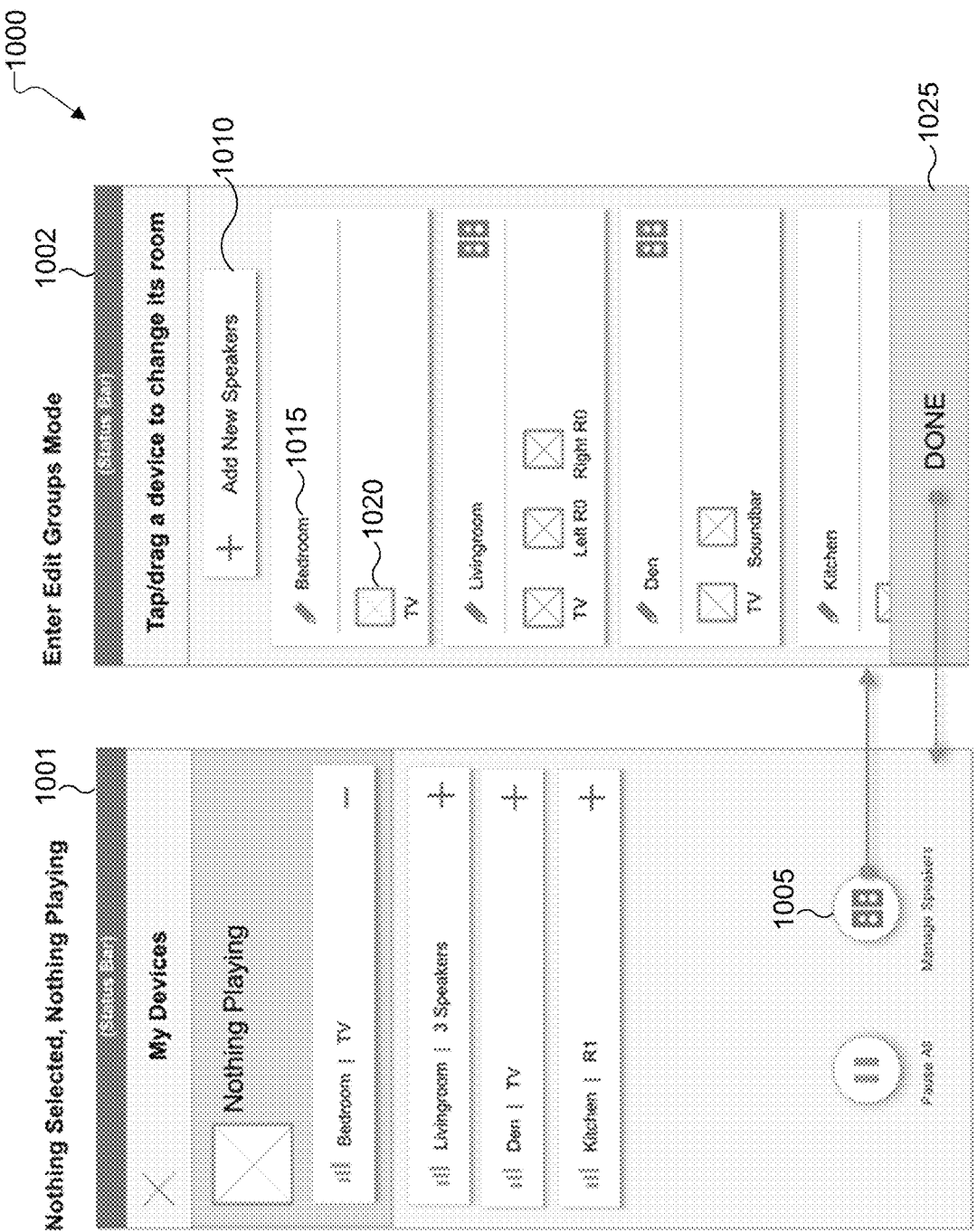
FIG. 10 illustrates an example of regrouping devices according to embodiments of the present disclosure.

FIG. 10 illustrates an example of regrouping devices 1000 according to embodiments of the present disclosure. The embodiment of the regrouping devices 1000 illustrated in FIG. 10 is for illustration only. FIG. 10 does not limit the scope of this disclosure to any particular embodiment of an electronic device.

Interface 1001 includes a manage-group icon 1005. The manage-group icon 1005 displays an interface 1002, which further displays an add-device icon 1010, and the groups 1015 with the devices 1020 in the groups, and a done icon 1025. The add-device icon 1010 initiates the application 362 to search the Wi-Fi network for a newly connected device. The devices 1020 in the groups 1015 can be selected to remove the specific device 1020 from the group. The done icon 1025 closes the interface 1002 and display interface 1001.

In certain embodiments, subgroups may be provided based on nature of content supported by the devices. For example, a tablet and a TV may be grouped into Sub1, two speakers are grouped into Sub2, while they are all assigned to the "living room" group. Another example, two speakers on the left side of a room are grouped into Sub3 and the rest of the speakers are grouped into Sub4. The user is thus able to allow one source played by devices of Sub3 and another source played by devices of Sub3, when the user tries to compose new content. Other groupings might include a television used as a single Bluetooth device, or a television grouped with two Bluetooth speakers that act as rear surrounds. Sub groups might also reconfigure themselves for a portable device, where a device that has been moved to another room automatically reconfigures itself to be a part of that room.

In certain embodiments, the user is able to provide a room layout description, and the application 362 recommends device configurations adaptively. Such configurations could be performed by taking a picture of the room and converting it to a map, identifying objects that could affect the acoustic properties of the room, such as curtains, couches, televisions, etc. Complex multi-room channel creation/tuning could also be performed by emitting a ping from each speaker and having a mobile device located in the "sweet spot" of the room performs a latency and EQ calibration.

In certain embodiments, a unique indicator is assigned to each individual group. The unique indicator can be a color, symbol, number, etc. Content presented onto devices of a group can be associated with the same unique indicator representing the group. For example, each device in a group would display the same color when the unique identifiers are colors.

Figure 11:
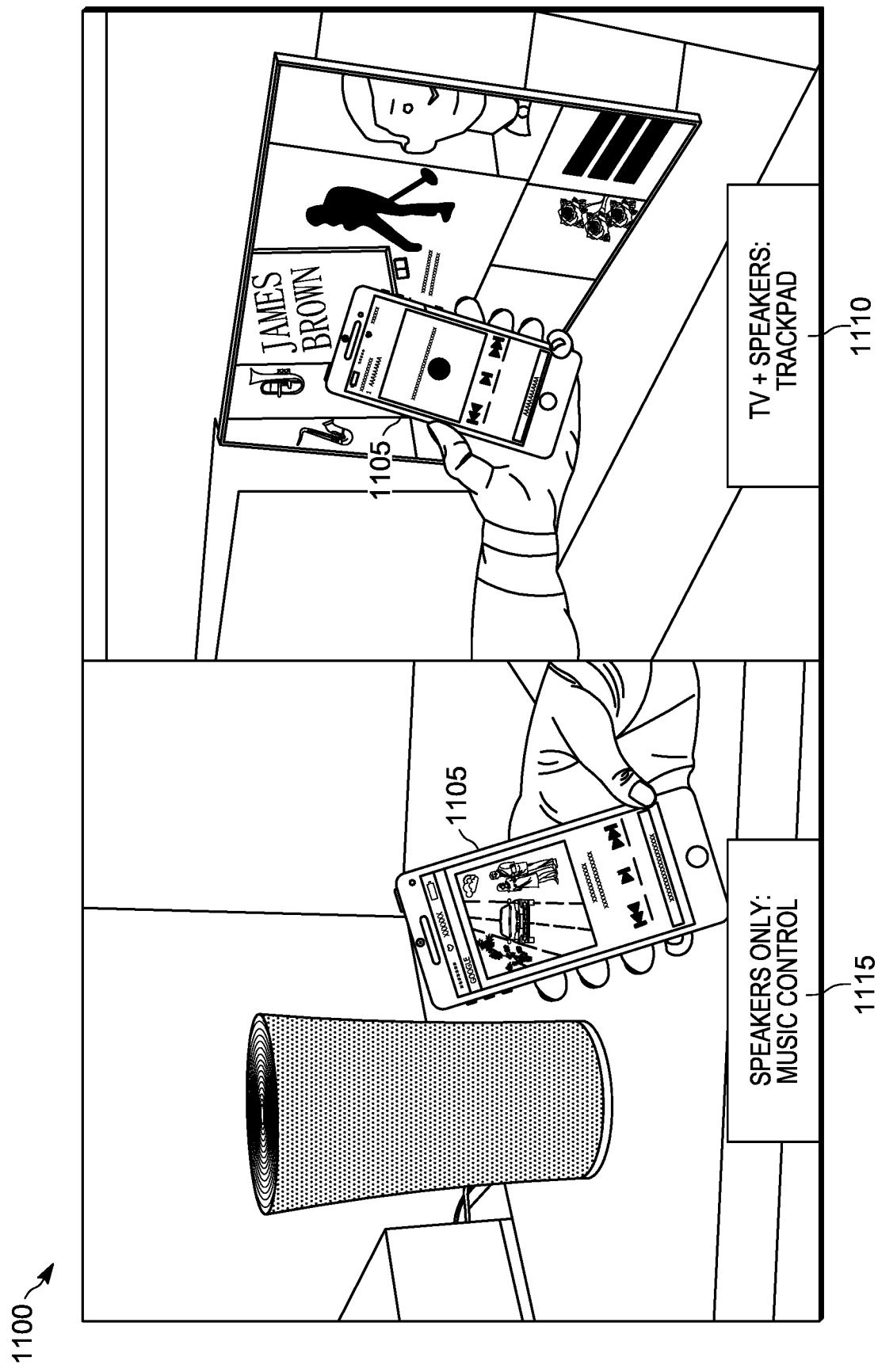
FIG. 11 illustrates an example switching of the UI controls based on a character of a proximity device according to embodiments of the present disclosure.

FIG. 11 illustrates an example switching 1100 of the UI controls based on a character of a proximity device according to embodiments of the present disclosure. The embodiments of the switching 1100 illustrated in FIG. 11 is for illustration only. FIG. 11 does not limit the scope of this disclosure to any particular embodiment of an electronic device.

The application 362 is capable of switching user interface controls corresponding to the character of the device in proximity. The smart device 1105 is a device running the application 362. When the smart device 1105 is near a television, a user interface for control of visual content may be presented, as illustrated in frame 1110. For example, the user interface for control of visual content may include a trackpad or other means for moving between items located on the display, a play/pause content icon, a next item, previous item, number pad, etc. When the smart device 1105 moves to be near to a speaker, a music playback user interface may be presented on the smart device, as illustrated in frame 1115. For example, the music playback user interface could include a volume bar, a play/pause content icon, next item icon, last item icon, an image or other detail related to the audio currently playing, a track bar for display of the current time and total time of the audio content, etc.

In certain embodiments, the smart device 1105 is able to save configuration history of a group for future references. With this feature, the user can freely adjust configuration of devices, and can revert back to a previous setting. In certain embodiments, the smart device 1105 is also able to record each device settings for the group. For example, a volume of a speaker, content level allowed to be presented at a television, etc. The smart device 1105 regularly refreshes devices of a group to remove nonexistent or removed devices.

In certain embodiments, a multi-user control is supported. For example, when another user initializes playing different content on devices belonging to Group I, the smart device 1105 will notify her that Group I is currently being used by another user and prompting both parties informing of multi-user control status.

Figure 12:
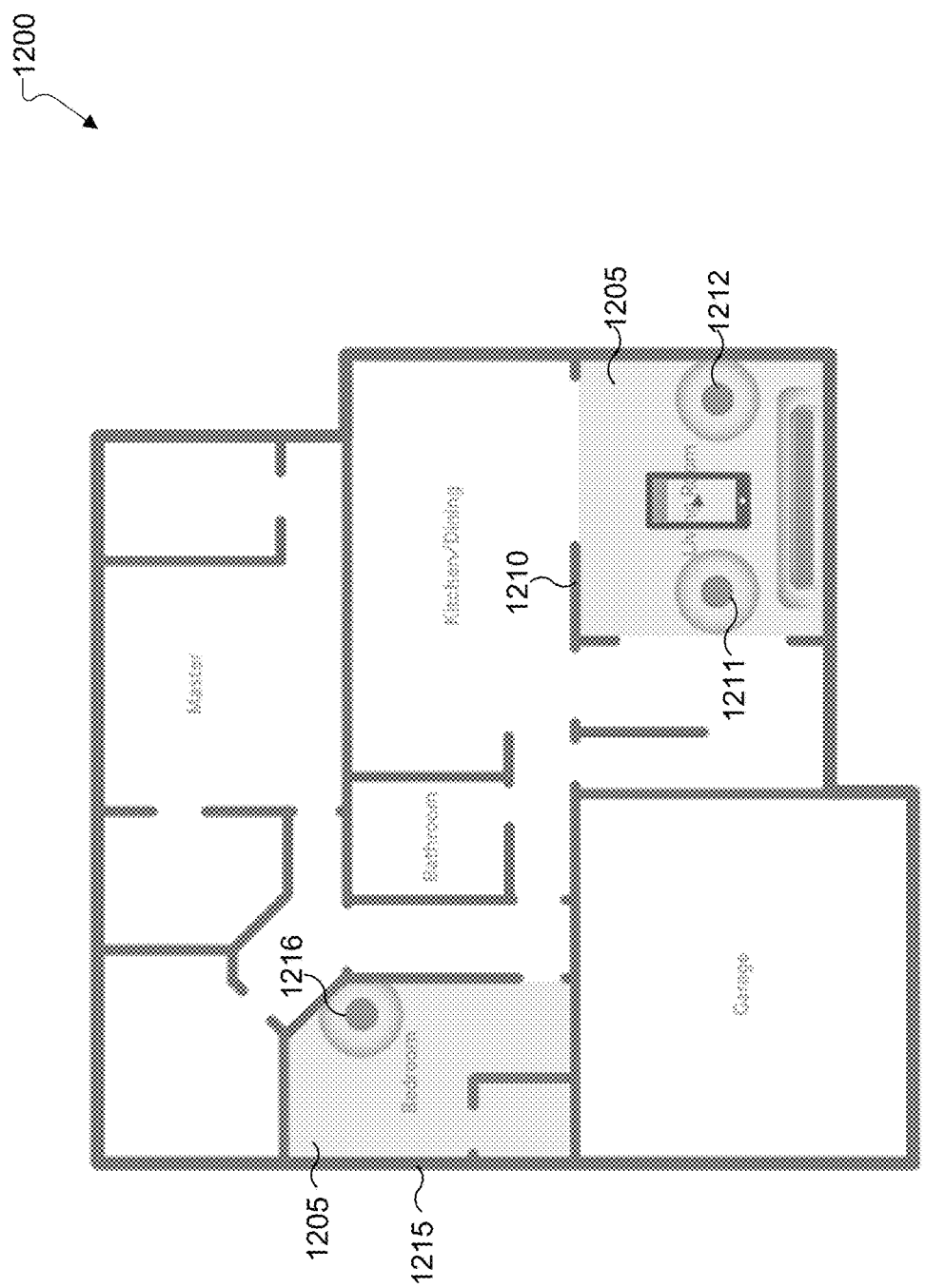
FIG. 12 illustrates an example system with distinctive indicators employed to identify various content that is currently consumed by the groups of devices according to embodiments of the present disclosure.

FIG. 12 illustrates an example system 1200 with distinctive indicators employed to identify various content that is currently consumed by the groups of devices according to embodiments of the present disclosure. The embodiment of the system 1200 illustrated in FIG. 12 is for illustration only. FIG. 12 does not limit the scope of this disclosure to any particular embodiment of an electronic device.

Distinctive indicators 1205 can be used on the user interface and on the devices themselves to indicate being a member of a group. Colors can be employed as distinctive indicators 1205 to identify various content that is currently consumed by the groups of devices. The color representation the unique content can be the same color as to the color representation the grouped devices that are consuming the unique content. A new device (or a previously grouped device) is able to be configured to be associated with a color so that content played by another grouped devices represented by that color can also be streamed at the new device (or the device that belongs to another group). The new device does not need to be grouped with the grouped devices, or to join a new group including these grouped devices. A user can just "listen in" to the color while the configuration of the existing group maintained. For example, two speakers 1211 and 1212 are in a group 1210 named "Living Room," and the two speakers 1211 and 1212 are configured as left/right stereo. There is a third speaker 1216 in the bedroom 1215, and has been configured as mono. When a user goes to the bedroom, she can just tap the button on the speaker 1216 or the user interface to change color representation of speaker 1216 to the color of group "Living Room" 1210 to listen to the content played on speakers 1211 and 1212. It works the same in the mobile app; rather than destroying the group the application 362 just "adds" it to the content. Ordinary people skilled in the art will appreciate that alternative indicator other than color may be applied to represent or indicate groups.

Figure 13:
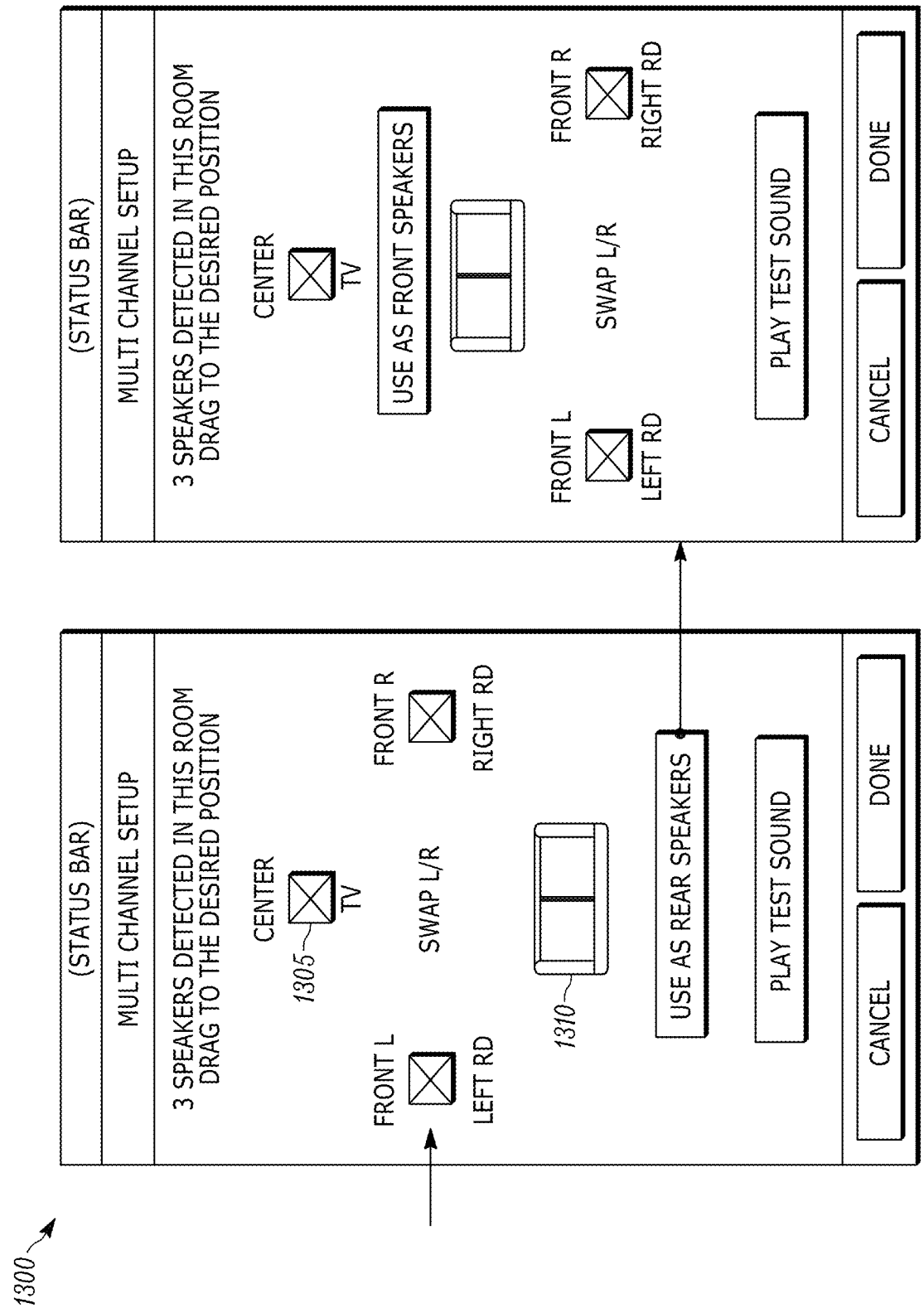
FIG. 13 illustrates an example of recommendations for various multi-channel systems or recommendations for adjustment of device position or orientation according to embodiments of the present disclosure.

FIG. 13 illustrates an example of recommendations 1300 for various multi-channel systems according to embodiments of the present disclosure. The embodiment of the recommendations 1300 illustrated in FIG. 13 is for illustration only. FIG. 13 does not limit the scope of this disclosure to any particular embodiment of an electronic device.

Multi-channel setup does not only recommend multi-channel configuration based on detection of devices, but also recommends a configuration to adjust a device position or orientation to achieve the optimal acoustic properties. Location of the devices 1305 and also obstacles 1310 (e.g., furniture, structures, etc.) in the same area hosting the devices 1305 may be determined based on Bluetooth and ultrasound. For example, for a group with two speakers positioned apart (for example, a television with speakers on the sides), the smart device running the application 362 will be able to determine distance of other devices (speakers, for example) and the location of other devices using triangulation based on its own speakers.

Figure 14:
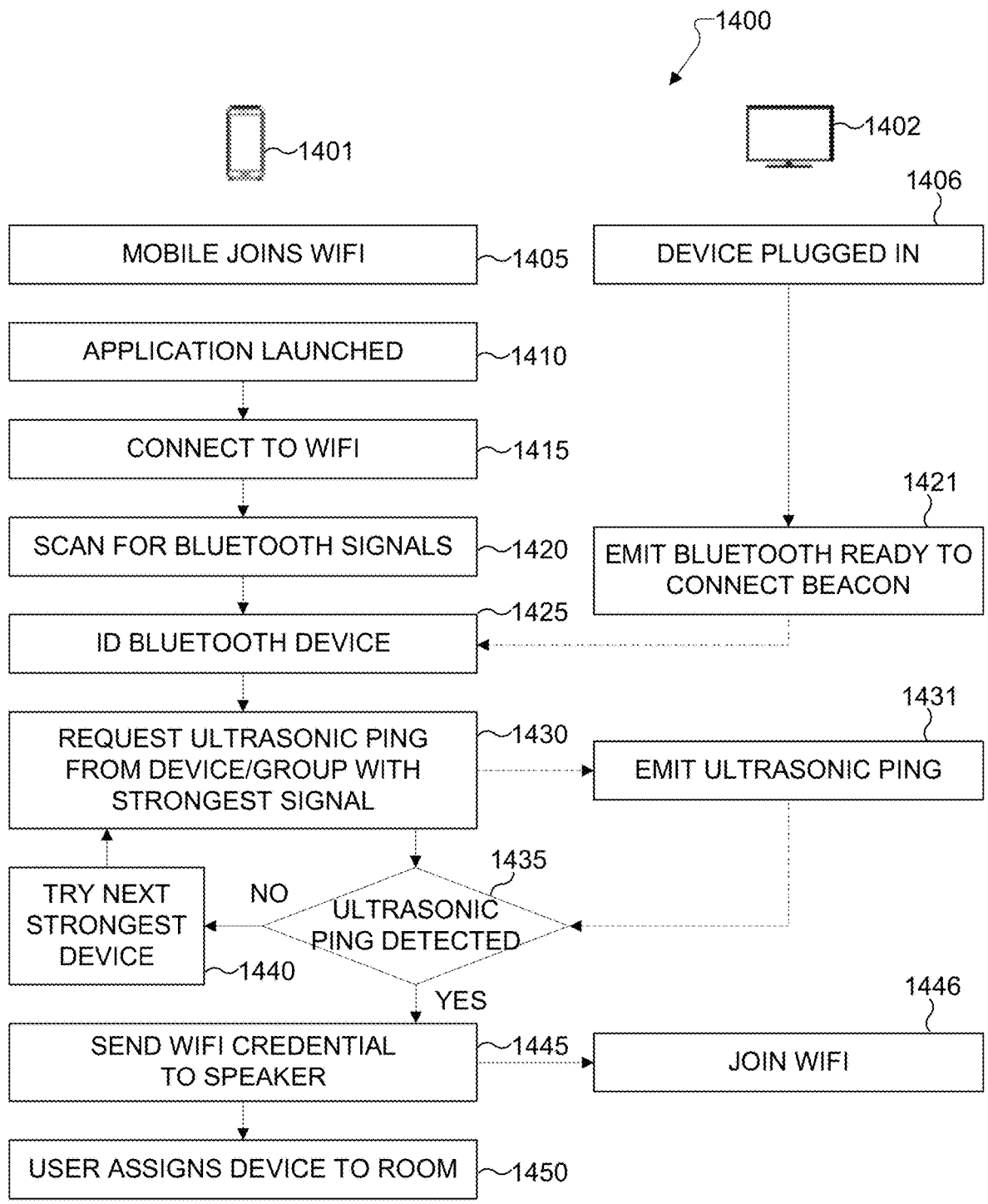
FIG. 14 illustrates an example process for a first time set up of a device according to embodiments of the present disclosure.

FIG. 14 illustrates an example process 1400 for a first time set up of a device according to embodiments of the present disclosure. For example, the process 1400 depicted in FIG. 14 may be performed by the electronic device 106-114 in FIG. 1 or the electronic device 300 in FIG. 3.

In operation 1405, the media device 1401 joins the Wi-Fi network associated with the application 362. In operation 1406, a media device 1402 is powered on. The media device 1402 is currently unknown to the application 362. In operation 1410, the media device 1401 launches the application 362. In operation 1415, the media device 1401 connects to the Wi-Fi network.

In operation 1420, the media device 1401 initializes a pairing process, such as scanning for Bluetooth signals, from the media device 1402 also initializing a pairing process and emitting a Bluetooth ready-to-connect beacon, in operation 1421. The application receives an indication, such as a user input for detecting a new device, when a new device is to be connected to the application or media group. The media device 1402 can also be operated to initiate a pairing process, such as a user controlling. In operation 1425, the media device 1401 identifies the media device 1402 through the Bluetooth pairing process. The first media device 1401 detects a second media device 1402 that is not connected to the media group.

In operation 1430, the media device 1401 requests an ultrasonic ping from a device or group with the strongest signal and media device 1402. In operation 1431, the media device 1402 emits an ultrasonic ping. In operation 1435, the media device 1401 determines whether an ultrasonic ping is detected from the device or group with the strongest signal and media device 1402. In operation 1440, the media device repeats operation 1430 and 1435 with a next strongest media device or group until an ultrasonic ping is detected from both the other device and the media device 1402.

In operation 1445, the media device 1401 transmits the Wi-Fi credentials to the media device 1402 once the ultrasonic ping is detected, and the media device 1402 joins the Wi-Fi network in operation 1446.

In operation 1450, the media device 1401 assigns the media device 1402 to a room or group associated with the device that detected the ultrasonic ping.

Although FIG. 14 illustrates an example process 1400 for a first time set up of a device, various changes could be made to FIG. 14. For example, while shown as a series of steps, various steps in each figure could overlap, occur in parallel, occur in a different order, or occur multiple times.

Figure 15A:
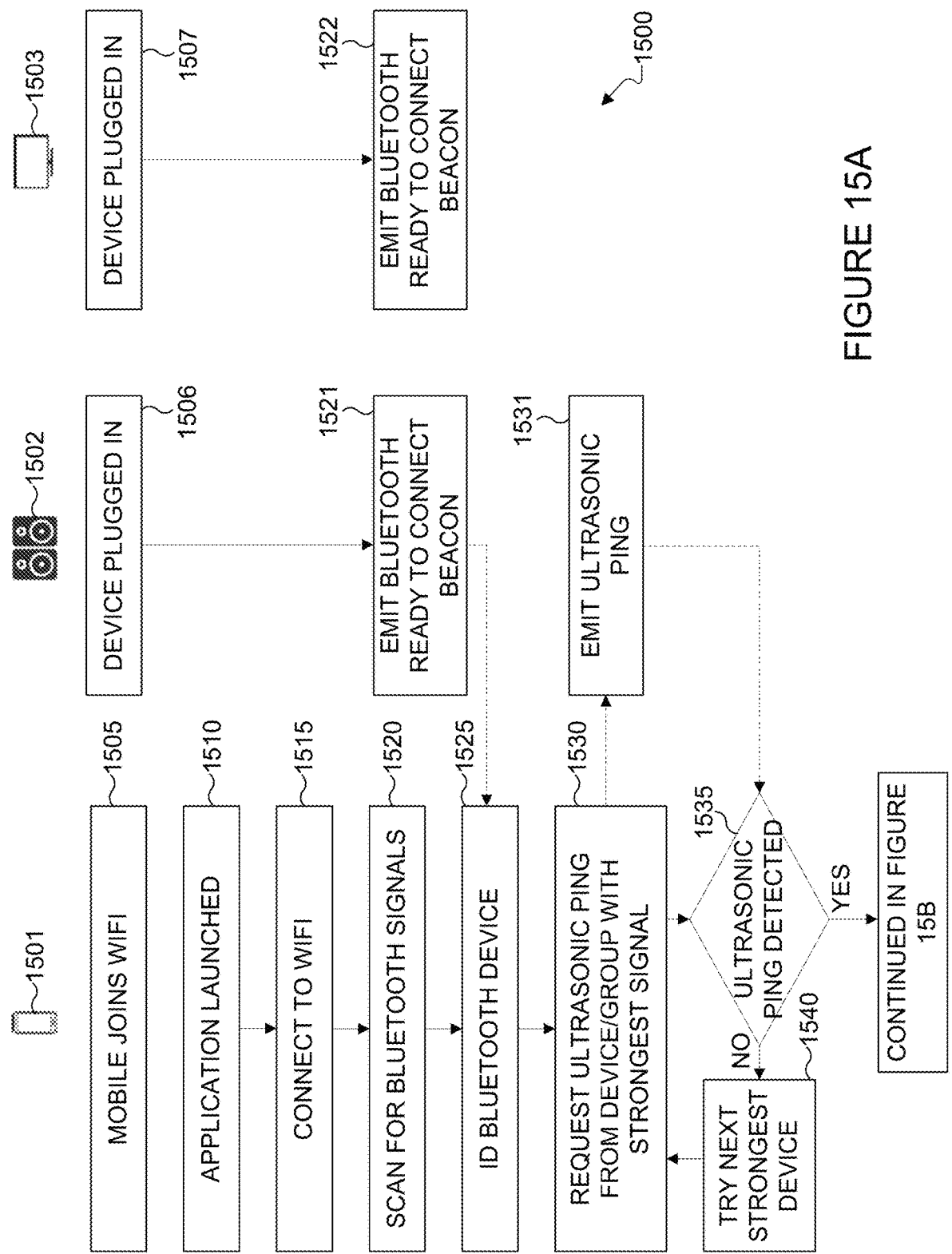
FIGS. 15A and 15B illustrate an example process for a subsequent device setup in a group according to embodiments of the present disclosure.
Figure 15B:
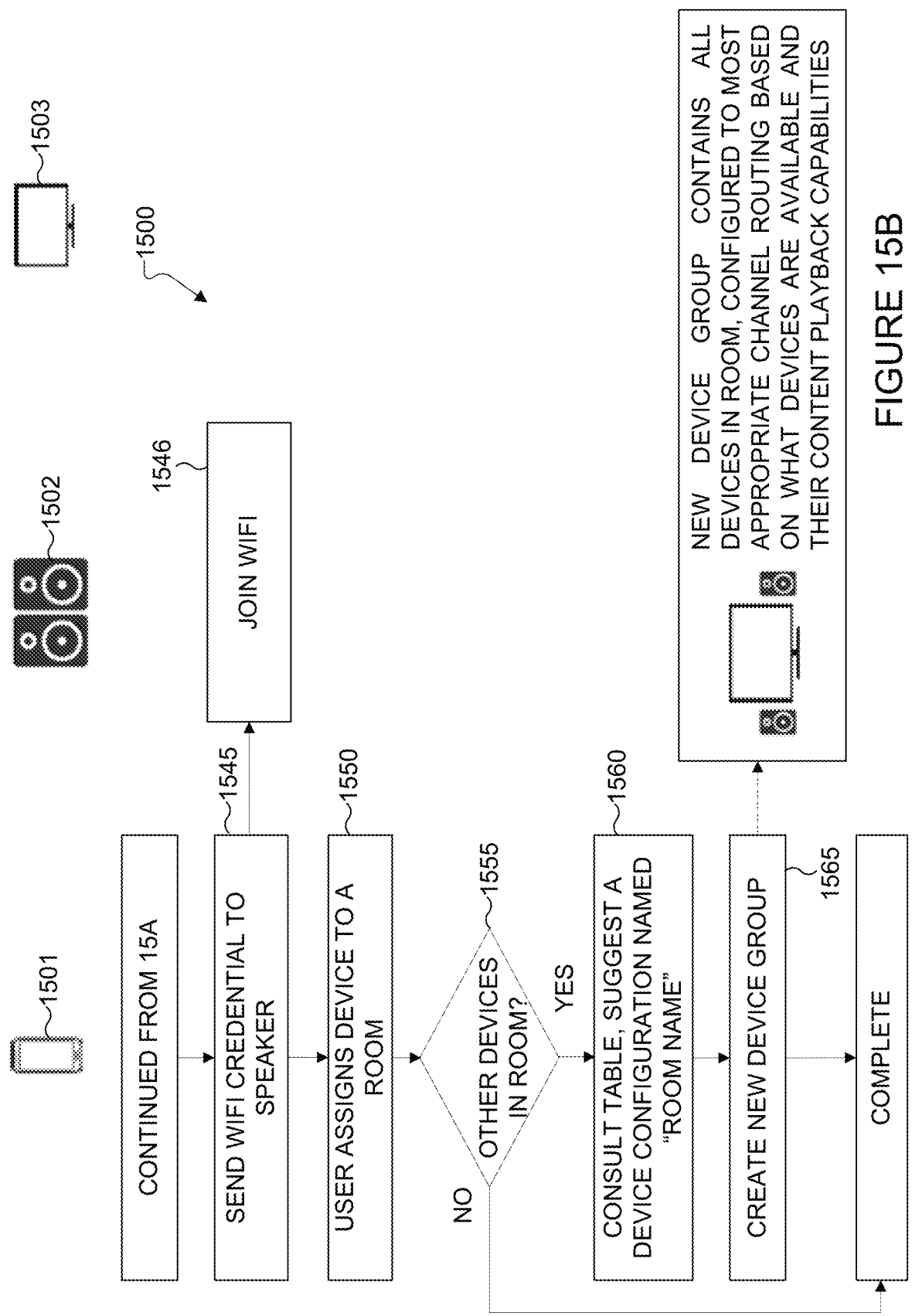

FIGS. 15A and 15B illustrate an example process 1500 for a subsequent device setup in a group according to embodiments of the present disclosure. For example, the process 1500 depicted in FIG. 15 may be performed by the electronic device 106-114 in FIG. 1 or the electronic device 300 in FIG. 3.

In operation 1505, the media device 1501 joins the Wi-Fi network associated with the application 362. In operation 1506, a first media device 1502 is powered on. In operation 1507, a second media device 1503 is plugged in. The media devices 1502 and 1503 are currently unknown to the application 362. In operation 1510, the media device 1501 launches the application 362. In operation 1515, the media device 1501 connects to the Wi-Fi network.

In operation 1520, the media device 1501 initializes a pairing process, such as scanning for Bluetooth signals, from the media device 1502 also initializing a pairing process and emitting a Bluetooth ready-to-connect beacon, in operation 1521, and the second media device 1503 initializing a pairing process and emitting a Bluetooth ready-to-connect beacon, in operation 1522. In operation 1525, the media device 1501 identifies the media device 1502 through the Bluetooth pairing process.

In operation 1530, the media device 1501 requests an ultrasonic ping from a device or group with the strongest signal. The device or group with the strongest signal requests the media device 1502 to emit an ultrasonic ping. In operation 1531, the media device 1502 emits an ultrasonic ping. In operation 1535, the media device 1501 determines whether the device or group with the strongest signal detects the ultrasonic ping. In operation 1540, the media device repeats operation 1530 and 1535 with a next strongest media device or group if the ultrasonic ping is not detected.

In operation 1545, the media device 1501 transmits the Wi-Fi credentials to the media device 1502 once the ultrasonic ping is detected, and the media device 1502 joins the Wi-Fi network in operation 1546.

In operation 1550, the media device 1501 assigns the media device 1502 to a room or group associated with the device or group that detected the ultrasonic ping.

In operation 1555, the media device 1501 determines whether other devices exist in the room or group. The media device 1501 determines a total amount of media device in the media group. If other devices are in the room or group, the media device 1501 consults a table, as illustrated in FIGS. 6 and 7, in order to suggest a media group configuration for the devices in the room or group in operation 1560. The media device 1501 recommends a multi-channel configuration for the media group based on the determined total amount of media devices in the media group. The recommendations for the multi-channel configuration can also be based on the relative positions of the media devices in the media group, a content consumption capability supported by the media devices in the media group, and/or a physical structure. US Patent Application No. 2016/0291141 titled "Apparatus and method for measuring distance and location," is hereby incorporated by reference. US Patent Application No. 2017/0123037 title "method for calculating angular position of peripheral device with respect to electronic apparatus, and peripheral device with function of the same," is hereby incorporated by reference.

In operation 1565, the media device 1501 creates a new device group. Where the new device group contains all devices in the room or group and is configured to a most suitable channel routing based on what devices are available and their content playback abilities, relative positions, and/or physical structure.

Although FIGS. 15A and 15B illustrate an example process 1500 for a subsequent device setup in a group, various changes could be made to FIGS. 15A and 15B. For example, while shown as a series of steps, various steps in each figure could overlap, occur in parallel, occur in a different order, or occur multiple times.

Figure 16:
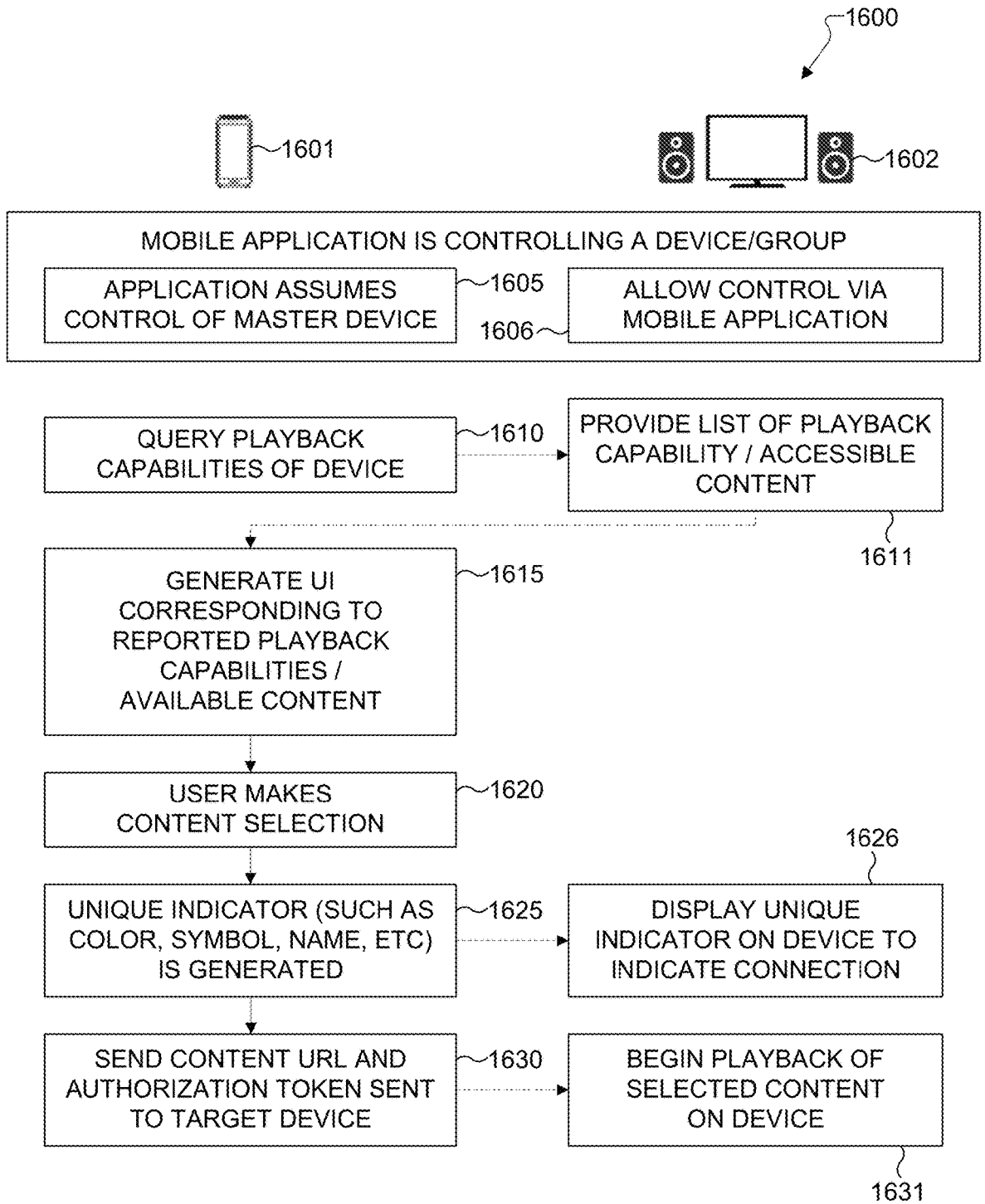
FIG. 16 illustrates an example process for a basic playback of content on a device according to embodiments of the present disclosure.

FIG. 16 illustrates an example process 1600 for a basic playback of content on a device according to embodiments of the present disclosure. For example, the process 1600 depicted in FIG. 16 may be performed by the electronic device 106-114 in FIG. 1 or the electronic device 300 in FIG. 3. Device 1601 is referred to as a first device and device 1602 is referred to as a second device.

In operation 1605, the media device 1601 launches the application to assume control as the master device. The application 362 controls the device or group. In operation 1606, the group 1602 allows control of the media playback via the application 362.

In operation 1610, the media device 1601 queries the playback capabilities of the one or more devices in the group 1602 or the group 1602 itself. In operation 1611, the group 1602 would provide a list of the playback capability or accessible content for the group 1602 or each individual device in the group 1602. For example, a speaker without a display would return an audio-only playback capability, a monitor without speakers would return video-only playback capability, and a device with audio and visual (e.g., a television) would return audio-and-video playback ability. The user could manually set in the application or within the device reduced functionality for device. For example, a television may include a display and speaker. But if the speakers installed with the television are inferior to other speakers in the group 1602, the user could turn off the playback capability of the speakers for the TV while in that group 1602.

In operation 1615, the media device 1601 generates a user interface corresponding to reported playback capabilities or available content. The available content can include content stored in the device group 1602 or streamed from an external source for the device group 1602.

The first media device queries the media group for playback capability or accessible content. The devices in the media group or the media group transmit their playback capability and accessible content to the first media device. The first media device receives the indication of the playback capability or the accessible content from the media devices. The media device displays a user interface that corresponds with the received indication of the playback capability or accessible content of the media devices. For example, a user interface displays audio controls when a speaker is detected, visual controls when a display is detected, and both visual and audio controls when a speaker and display combination are detected.

In operation 1620, the media device 1601 receives a selection of content. The media device 1601 receives an indication for playback of content using the media group. The indication can include a play button on a particular device in a group or a button on a user interface for the application 362. The media device can receive the indication as a signal or message from the device that the user initiates the selection of content. For example, the user can control a speaker using a physical button, touchscreen interface, etc. to activate the content for the group. The speaker transmits a signal to other devices in the group or a media device operating the application to begin playback of the content or switch to different content.

In operation 1625, a unique indicator is generated for the group. In operation 1626, the device group 1602 displays the unique indicator on the devices to indicate connection. A unique or distinctive indicator corresponding to the selected content is applied to the media group. The application 362 controls the media devices in the media group to display the distinctive indicator. The distinctive indicator can be a color, a symbol, a number, etc.

In operation 1630, the media device 1601 sends content URL and authorization token to the target device or the device group 1602. In operation 1631, the device group 1602 begins playback of the selected content on the devices included in the device group 1602.

Although FIG. 16 illustrates an example process 1600 for a basic playback of content on a device, various changes could be made to FIG. 16. For example, while shown as a series of steps, various steps in each figure could overlap, occur in parallel, occur in a different order, or occur multiple times.

Figure 17:
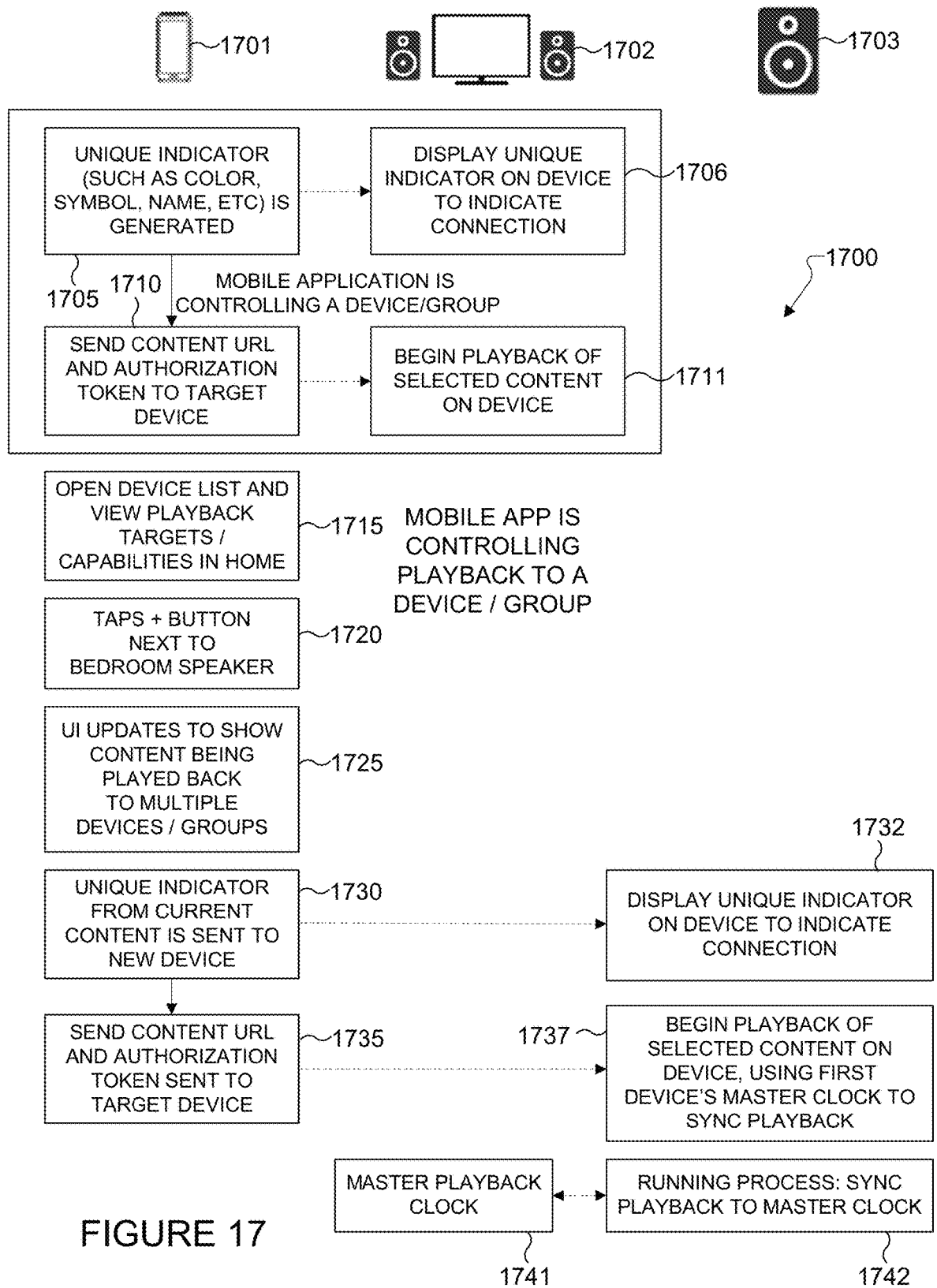
FIG. 17 illustrates an example process for sending content to multiple groups according to embodiments of the present disclosure.

FIG. 17 illustrates an example process 1700 for sending content to multiple groups according to embodiments of the present disclosure. For example, the process 1700 depicted in FIG. 17 may be performed by the electronic device 106-114 in FIG. 1 or the electronic device 300 in FIG. 3. Device 1701 is referred to as a first device and device 1702 is referred to as a second device.

In operations 1705-1711, the application 362 is controlling a device or a group 1702. In operations 1715-1742, the application is controlling playback to the device or group 1702.

In operation 1705, the media device 1701 generates a unique indicator corresponding to selected content. In operation 1706, device or group 1702 displays the unique indicator on the devices to indicate connection.

In operation 1710, the media device 1701 sends a content URL and authorization token to a target device, such as the device or group 1702. In operation 1711, the group 1702 or device 1703 begins playback of the selected content.

In operation 1715, the media device 1701 opens a device list and view playback targets or capabilities in the application 362.

In operation 1720, the media device 1701 receives indication that a device 1703, which is outside the group 1702, is to also playback the selected content. The indication can be a button on the user interface of the application corresponding to the new device 1703. A new group can be added in a similar fashion on the user interface for the application 362.

In operation 1725, the media device 1701 updates the user interface for the application 362 to show content being played back to both the device 1703 and the group 1702.

In operation 1730, the media device 1701 sends the unique indicator from the selected content to the new device 1703. In operation 1732, the new device 1703 displays the unique indicator to indicate connection to the group.

In operation 1735, the media device 1701 sends the content URL and authorization token, which were previously sent to the group 1702, to the new device 1703. In operation 1737, the device 1703 begins playback of the selected content using media device 1701 master clock to sync playback.

In operation 1741, the media group 1702 controls the master playback clock. In operation 1742, the device 1703 syncs playback during the running process to the master clock of group 1702.

In certain embodiments, the media device 1701 can receive a signal from another media device of the media group indicating that a second distinctive indicator is selected on group 1702 or device 1703. The second device indicator identifies a second content and also identifies whether the change of the distinctive indicator applies to all active devices in the media group, to only the group 1702, or a specific device, such as device 1703 or an individual device of group 1702.

The media device 1701 then controls the media devices of the media group to playback the second content based on the second content indicator. The media devices of the media group remain on the content corresponding to the displayed distinctive indicator. When the second distinctive indicator identifies only changing a specific media device, only the specific media device changes the playback content.

Although FIG. 17 illustrates an example process 1700 for adding a single device into a group, various changes could be made to FIG. 17. For example, while shown as a series of steps, various steps in each figure could overlap, occur in parallel, occur in a different order, or occur multiple times.

Figure 18:
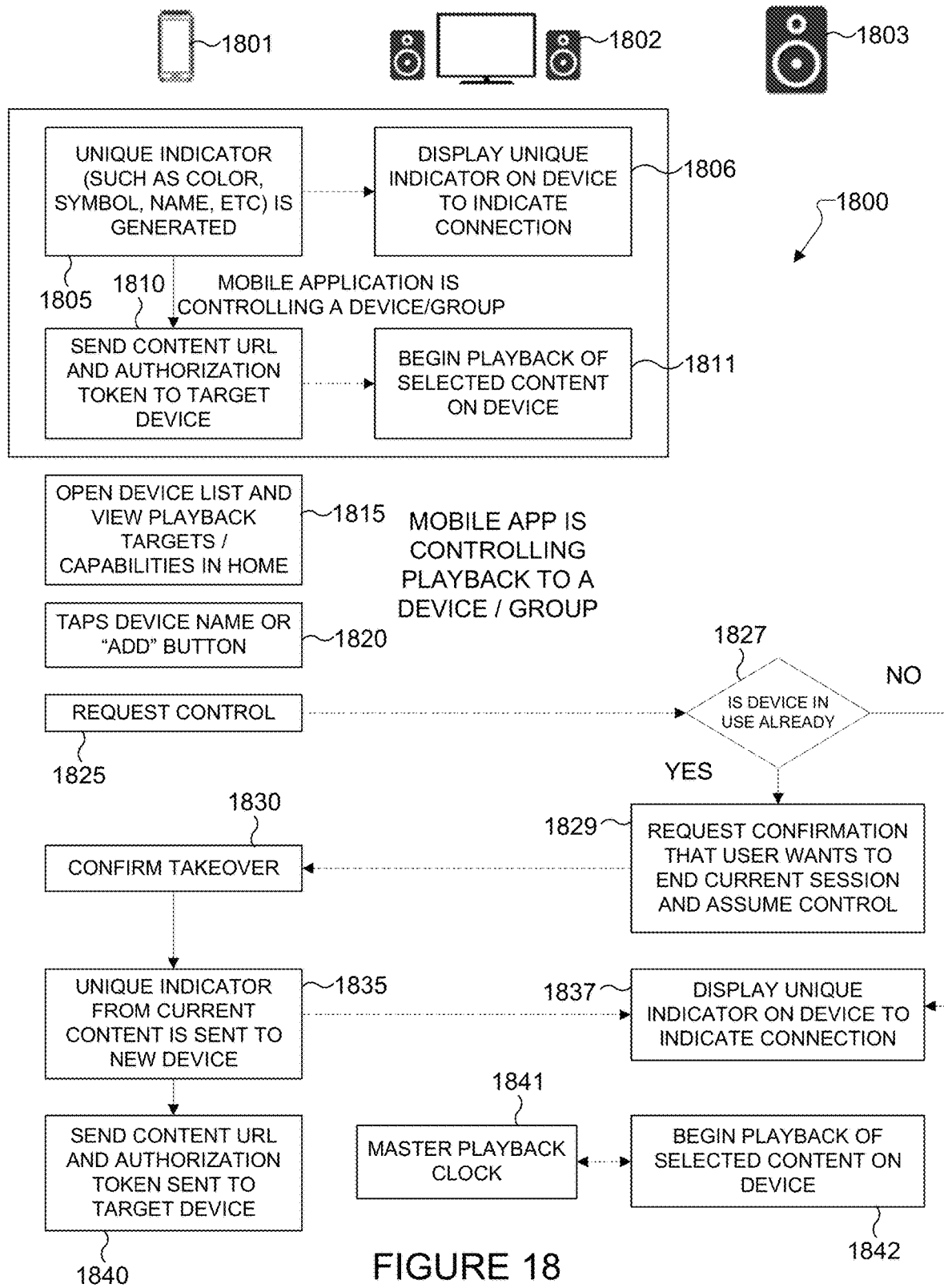
FIG. 18 illustrates an example process for taking control of a device currently playing alternative content according to embodiments of the present disclosure.

FIG. 18 illustrates an example process 1800 for taking control of a device currently playing alternative content according to embodiments of the present disclosure. For example, the process 1800 depicted in FIG. 18 may be performed by the electronic device 106-114 in FIG. 1 or the electronic device 300 in FIG. 3. Device 1801 is referred to as a first device and device 1802 is referred to as a second device.

In operations 1805-1811, the application 362 is controlling a device or a group 1802. In operations 1815-1842, the application is controlling playback to the device or group 1802.

In operation 1805, the media device 1801 generates a unique indicator corresponding to selected content. In operation 1806, device or group 1802 displays the unique indicator on the devices to indicate connection.

In operation 1810, the media device 1801 sends a content URL and authorization token to a target device, such as the device or group 1802. In operation 1811, the group 1802 or device 1803 begins playback of the selected content.

In operation 1815, the media device 1801 opens a device list and view playback targets or capabilities in the application 362.

In operation 1820, the media device 1801 receives indication that a device 1803, which is outside the group 1802, is to also playback the selected content. The indication can be a button on the user interface of the application corresponding to the new device 1803. A new group can be added in a similar fashion on the user interface for the application 362.

In operation 1825, the media device 1801 requests control of device 1803. In operation 1827, the device 1803 determines whether it is already in use. If the device is not in use, the device 1803 displays the unique indicator in operation 1837 sent from the media device in operation 1835. If the device 1803 is in use, the device 1803 requests confirmation of takeover in operation 1829.

In operation 1829, the device 1803 requests confirmation that the media device 1801 wants to end device 1803 current session and assume control. In operation 1830, the media device 1801 confirms takeover of the device 1803.

In operation 1835, the media device 1801 sends the unique indicator from the selected content to the new device 1803. In operation 1837, the new device 1803 displays the unique indicator to indicate connection to the group.

In operation 1840, the media device 1801 sends the content URL and authorization token, which were previously sent to the group 1802, to the new device 1803. In operation 1837, the device 1803 begins playback of the selected content using user device 1801 master clock to sync playback. In operation 1841, the media group 1802 controls the master playback clock.

Although FIG. 18 illustrates an example process 1800 for taking control of a device currently playing alternative content, various changes could be made to FIG. 18. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A first media device associated with a media group comprising:
   a transceiver configured to transmit or receive signals, and
   a processor coupled to the transceiver, the processor configured to:
      detect a second media device that is not subscribed to the media group, based on the signals;
      assign the detected second media device to the media group;
      detect a current location and a relative position for each of media devices in the media group, including the second media device;
      provide a multi-channel configuration for the media group based on the detected current location and the relative position for each of the media devices;
      receive a selection of content; and
      in response to the selection of content, generate a distinctive indicator corresponding to the selected content for display on the media devices in the media group.

2. The first media device of claim 1, wherein to recommend the multi-channel configuration is further based upon:
   a content consumption capability supported by the media devices in the media group, and
   a physical structure commonality between the media devices in the media group.

3. The first media device of claim 1, wherein:
   receive the selection of content comprises receiving indication for playback of first content using the media group; and
   the processor is further configured to:
      cause the media devices in the media group to display the distinctive indicator; and
      transmit a content URL and an authorization token to at least one of the media devices.

4. The first media device of claim 3, wherein the processor is further configured to:
   receive a signal from a third media device included in the media group indicating that a second distinctive indicator is selected on the third media device, wherein the second distinctive indicator identifies a second content and identifies whether a change applies to the media group or only the third media device; and
   cause the media devices of the media group to playback the first content or the second content based on the second distinctive indicator, wherein remaining devices of the media devices of the media group remain on content corresponding to the distinctive indicator when the second distinctive indicator is only applicable to the third media device corresponding to the received signal.

5. The first media device of claim 3, wherein the displayed distinctive indicator is at least one of: a color, a symbol, and a number.

6. The first media device of claim 1, wherein the processor is further configured to:
   query the media devices of the media group for playback capability or accessible content;
   receive indication of the playback capability or accessible content from the media devices; and
   display a user interface that corresponds with received indication of the playback capability or accessible content of the media devices.

7. The first media device of claim 6, wherein:
   the user interface includes audio controls when a speaker is detected, and
   the user interface includes visual controls when a display is detected.

8. A method for a media group management, comprising:
   detecting a media device that is not subscribed to a media group;
   assigning the detected media device to the media group;
   detecting a current location and a relative position for each of media devices in the media group, including the detected media device;
   providing a multi-channel configuration for the media group based on the detected current location and the relative position for each of the media devices;
   receiving a selection of content; and
   in response to the selection of content, generating a distinctive indicator corresponding to the selected content for display on the media devices in the media group.

9. The method of claim 8, wherein recommending the multi-channel configuration is further based upon:
a content consumption capability supported by the media devices in the media group, and
a physical structure commonality between the media devices in the media group.

10. The method of claim 8, further comprising:
receiving the selection of content comprises receiving indication for playback of first content using the media group; and
causing the media devices in the media group to display the distinctive indicator; and
transmitting a content URL and an authorization token to at least one of the media devices.

11. The method of claim 10, further comprising:
receiving a signal from a third media device included in the media group indicating that a second distinctive indicator is selected on the third media device, wherein the second distinctive indicator identifies a second content and identifies whether a change applies to the media group or only the third media device; and
causing the media devices of the media group to playback the first content or the second content based on the second distinctive indicator, wherein remaining devices of the media devices of the media group remain on content corresponding to the distinctive indicator when the second distinctive indicator is only applicable to the third media device corresponding to the received signal.

12. The method of claim 10, wherein the displayed distinctive indicator is at least one of: a color, a symbol, and a number.

13. The method of claim 8, further comprising:
querying the media devices of the media group for playback capability or accessible content;
receiving indication of the playback capability or accessible content from the media devices; and
displaying a user interface that corresponds with received indication of the playback capability or accessible content of the media devices.

14. The method of claim 13, wherein:
the user interface includes audio controls when a speaker is detected, and
the user interface includes visual controls when a display is detected.

15. A non-transitory computer readable medium including a plurality of instructions that, when executed by a processor, are configured to cause the processor to:
detect a second media device that is not subscribed to a media group;
assign the detected second media device to the media group;
detect a current location and a relative position for each of media devices in the media group, including the second media device;
provide a multi-channel configuration for the media group based on the detected current location and the relative position for each of the media devices;
receive a selection of content; and
in response to the selection of content, generate a distinctive indicator corresponding to the selected content for display on the media devices in the media group.

16. The non-transitory computer readable medium of claim 15, wherein to recommend the multi-channel configuration is further based upon:
a content consumption capability supported by the media devices in the media group, and
a physical structure commonality between the media devices in the media group.

17. The non-transitory computer readable medium of claim 15, wherein:
receive the selection of content comprises receiving indication for playback of first content using the media group; and
the plurality of instructions is further configured to cause the processor to:
cause the media devices in the media group to display the distinctive indicator; and
transmit a content URL and an authorization token to at least one of the media devices.

18. The non-transitory computer readable medium of claim 17, wherein the plurality of instructions is further configure to cause the processor to:
receive a signal from a third media device included in the media group indicating that a second distinctive indicator is selected on the third media device, wherein the second distinctive indicator identifies a second content and identifies whether a change applies to the media group or only the third media device; and
control the media devices of the media group to playback the first content or the second content based on the second distinctive indicator, wherein remaining devices of the media devices of the media group remain on content corresponding to the distinctive indicator when the second distinctive indicator is only applicable the third media device corresponding to the received signal.

19. The non-transitory computer readable medium of claim 17, wherein the displayed distinctive indicator is at least one of: a color, a symbol, and a number.

20. The non-transitory computer readable medium of claim 15, wherein the computer readable program code that when executed further causes at least one processor to:
query the media devices of the media group for playback capability or accessible content;
receive indication of the playback capability or accessible content from the media devices; and
display a user interface that corresponds with received indication of the playback capability or accessible content of the media devices.

* * * * *